United States Patent
Murase et al.

(10) Patent No.: US 8,221,651 B2
(45) Date of Patent: Jul. 17, 2012

(54) WATER-DISPERSIBLE NANOPARTICLES HAVING HIGH LUMINOUS EFFICIENCY AND METHOD OF PRODUCING THE SAME

(75) Inventors: Norio Murase, Ikeda (JP); Chunliang Li, Ikeda (JP); Masanori Ando, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 545 days.

(21) Appl. No.: 12/427,138

(22) Filed: Apr. 21, 2009

(65) Prior Publication Data
US 2009/0315446 A1 Dec. 24, 2009

(30) Foreign Application Priority Data

Apr. 23, 2008 (JP) .................................. 2008-112097
Nov. 11, 2008 (JP) .................................. 2008-288393

(51) Int. Cl.
*C09K 11/08* (2006.01)
(52) U.S. Cl. .... 252/301.4 R; 252/301.4 S; 252/301.6 S; 252/301.4 F; 977/778; 977/815; 977/816; 977/818; 977/819; 977/820; 977/826; 977/834
(58) Field of Classification Search ........... 252/301.4 R, 252/301.4 S, 301.6 S, 301.4 F
See application file for complete search history.

(56) References Cited

U.S. PATENT DOCUMENTS

2003/0010987 A1* 1/2003 Banin et al. ..................... 257/82
2006/0202167 A1   9/2006 Landry et al.

FOREIGN PATENT DOCUMENTS

| JP | 2006-291175 A | 10/2006 |
| WO | 2004-065296 A1 | 8/2004 |
| WO | 2005-110916 A2 | 11/2005 |
| WO | 2006-076290 A1 | 7/2006 |

OTHER PUBLICATIONS

Haubold et al. "Strongly Luminescent InP/ZnS Core-Shell Nanoparticles", ChemPhysChem, 2001, No. 5, pp. 331-334.*
Qian, "Solvothermal Synthesis of Nanocrystalline III-V Semiconductors", Adavnaced Materials, vol. 11, Issue 13, Aug. 1999, 1101-112.*
Jaeckel, Uber einige neuzeitliche Absorptionsglaser, vol. 6 pp. 301-304, 1926.
Henglein, A.; "Photo—Degradation and Fluorescence of Colloidal—Cadmium Sulfide in Aqueous Solution"; Ber. Bunsenges. Phys. Chem., 1982, pp. 301-305, vol. 86.

(Continued)

*Primary Examiner* — Carol M Koslow
(74) *Attorney, Agent, or Firm* — Westerman, Hattori, Daniels & Adrian, LLP

(57) ABSTRACT

Nanoparticles having a core/shell structure consisting of a core comprising a Group III element and a Group V element at a molar ratio of the Group III element to the Group V element in the range of 1.25 to 3.0, and a shell comprising a Group II element and a Group VI element and having a thickness of 0.2 nm to 4 nm, the nanoparticles having a photoluminescence efficiency of 10% or more and a diameter of 2.5 to 10 nm; a method of producing the water-dispersible nanoparticles and a method of producing a glass matrix having the nanoparticles dispersed therein.

15 Claims, 12 Drawing Sheets

OTHER PUBLICATIONS

Nogami, Masayuki et. al.; "Preparation of Small-Particle-Size, Semiconductor CdS-Doped Silica Glasses by the Sol-Gel Process"; J. Am. Ceram. Soc., 1990, pp. 2097-2099, vol. 73, No. 7.

Ekimov, A.; "Growth and optical properties of semiconductor nanocrystals in a glass matrix"; Journal of Luminescence, 1996, pp. 1-20, vol. 70.

Dabbousi, B.O. et al.; "(CdSe) ZnS Core-Shell Quantum Dots: Synthesis and Characterization of a Size Series of Highly Luminescent Nanocrystallites"; J. Phys. Chem B., 1997, pp. 9463-9475, vol. 101.

Peng, Xiaogang et al.; "Epitaxial Growth of Highly Luminescent CdSe/CdS Core/Shell Nanocrystals with Photostability and Electronic Accessibility"; J. Am. Chem. Soc. 1997, pp. 7019-7029, vol. 119.

Li, Chunliang et al.; "Surfactant-dependent Photoluminescence of CdTe Nanocrystals in Aqueous Solution"; Chemistry Letters, 2005, pp. 92-93, vol. 34, No. 1.

Li, C.L. et al. "Highly luminescent water-soluble ZnSe nanocrystals and their incorporation in a glass matrix"; Colloids and Surfaces A: Physicochem. Eng. Aspects, 2007, pp. 33-39, vol. 294.

Micic, Olga et al; "Highly efficient band-edge emission from InP quantum dots"; Appl. Phys. Lett., May 27, 1996, pp. 3150-3152, vol. 68, No. 22.

Talapin, Dmitri V. et al.; "Etching of Colloidal InP Nanocrystals with Fluorides: Photochemical Nature of the Process Resulting in High Photoluminescence Efficiency"; J. Phys. Chem. B, 2002, pp. 12659-12663, vol. 106.

Haubold, Stephan et al.; "Strongly Luminescent InP/ZnS Core—Shell Nanoparticles"; Chemphyschem, 2001, pp. 331-334, vol. 5.

Cao, Yun Wei et al.; "Growth and Properties of Semiconductor Core/Shell Nanocrystals with InAs Cores"; J. Am. Chem. Soc., 2000, pp. 9692-9702, vol. 122.

Bharali, Dhruba J. et al.; "Folate-Receptor-Mediated Delivery of InP Quantum Dots for Bioimaging Using Confocal and Two-Photon Microscopy"; J. Am. Chem. Soc., 2005, pp. 11364-11371, vol. 127.

Zimmer, John P. et al.; "Size Series of Small Indium Arsenide-Zinc Selenide Core-Shell Nanocrystals and Their Application to in Vivo Imaging"; J. Am. Chem. Soc., 2006, pp. 2526-2527, vol. 128.

Xie, Renguo et al.; "Colloidal InP Nanocrystals as Efficient Emitters Covering Blue to Near-Infrared"; J. Am. Chem. Soc., 2007, pp. 15432-15433, vol. 129.

Guzelian, A. A. et al.; "Synthesis of Size-Selected, Surface-Passivated InP Nanocrystals"; J. Am. Chem. Soc., 1996, pp. 7212-7219, vol. 100.

Micic, Olga. I. et al.; "Core-Shell Quantum Dots of Lattice-Matched ZnCdSe2 Shells on InP Cores: Experiment and Theory"; J. Am. Chem. Soc., 2000, pp. 12149-12156, vol. 104.

Wei, Shuo et al.: "InP nanocrystals via surfactant-aided hydrothermal synthesis"; Journal of Applied Physics, Apr. 1, 2004, pp. 3683-3688, vol. 95, No. 7.

Matsumoto, Taichi et al.; "Organometallic Synthesis of InP Quantum Dots Using Tris(dimethylamino)phosphine as a Phosphorus Source"; Chemistry Letters, 2004, pp. 1492-1493, vol. 33, No. 11.

Dawson, William R. et al.; "Fluorescence Yields of Aromatic Compounds"; Fluorescence Yields of Aromatic Compounds, Sep. 1968, pp. 3251-3260, vol. 72, No. 9.

Adam, S. et al.; "The effect of nanocrystal surface structure on the luminescence properties: Photoemission study of HF-etched InP nanocrystals"; The Journal of Chemical Physics, 2005, pp. 084706-1-084706-10, vol. 123.

Kim, Sang-Wook et al.; "Engineering $InAs_xP_{1-x}$/InP/ZnSe III-V Alloyed Core/Shell Quantum Dots for the Near-Infrared"; J. Am. Chem. Soc., 2005, pp. 10526-10532, vol. 127.

* cited by examiner

[Fig. 1]
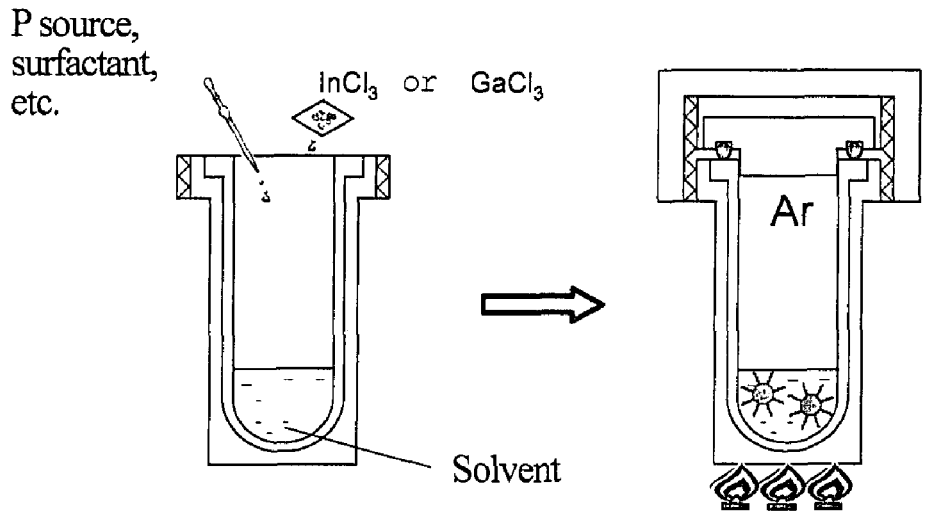
[Fig. 2]
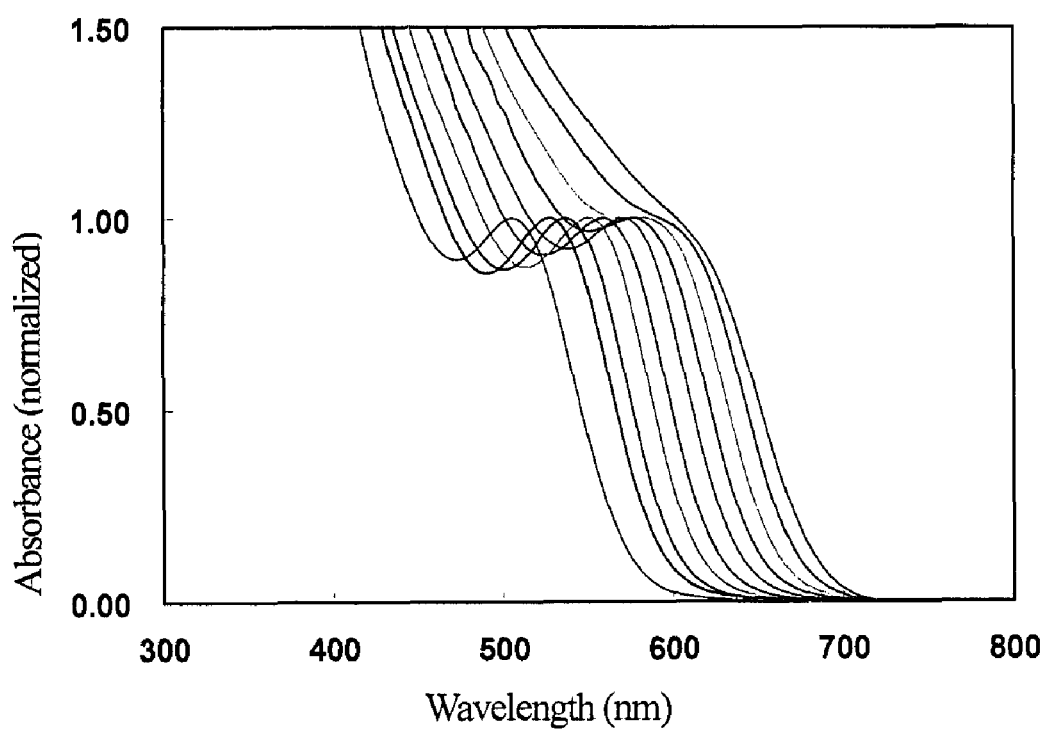

[Fig. 3]
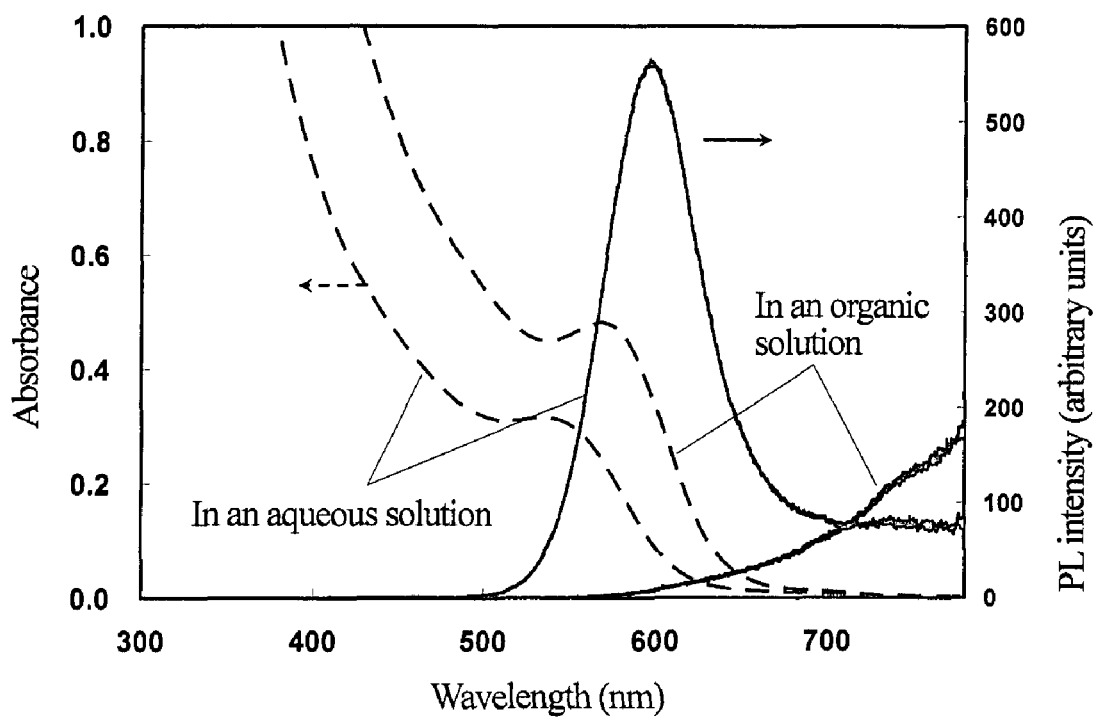

[Fig. 4]
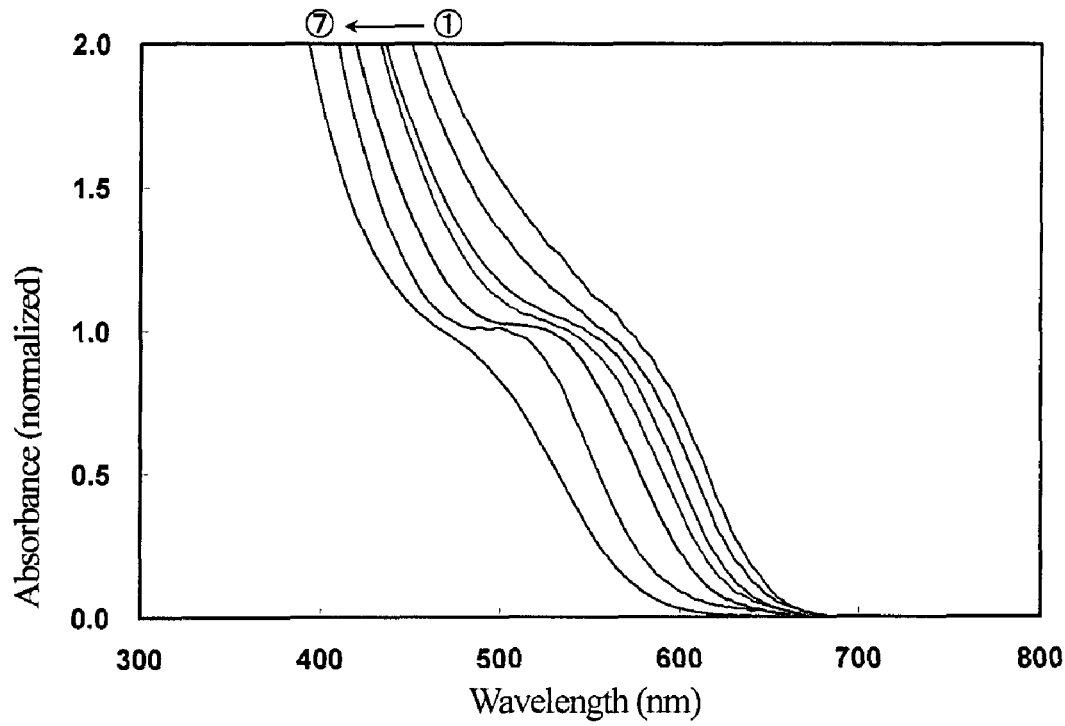
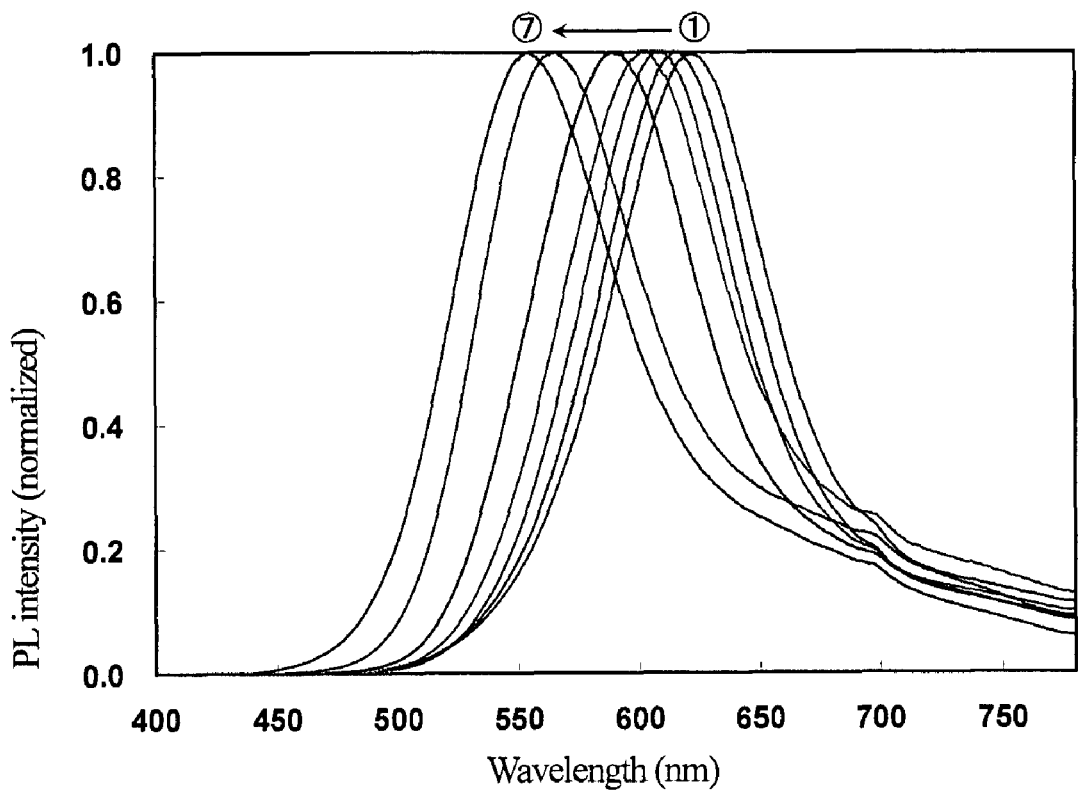

[Fig. 5]
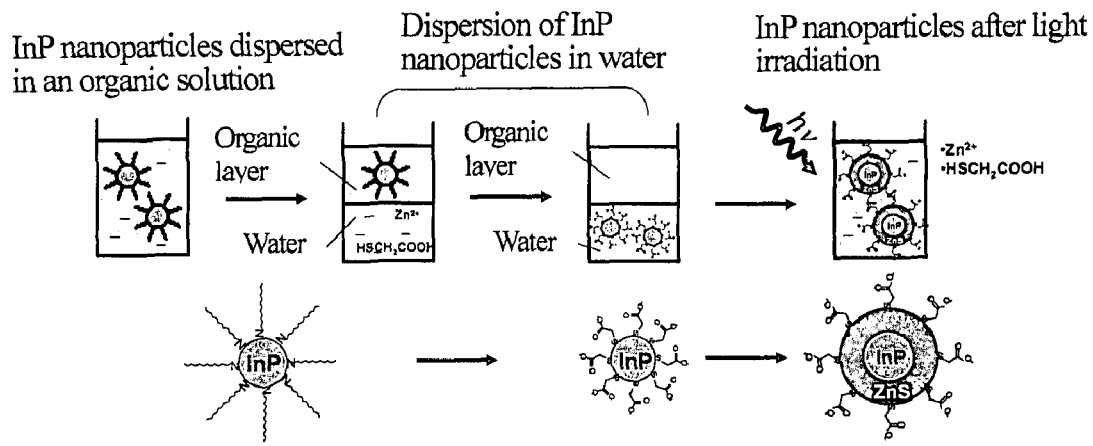
[Fig. 6]
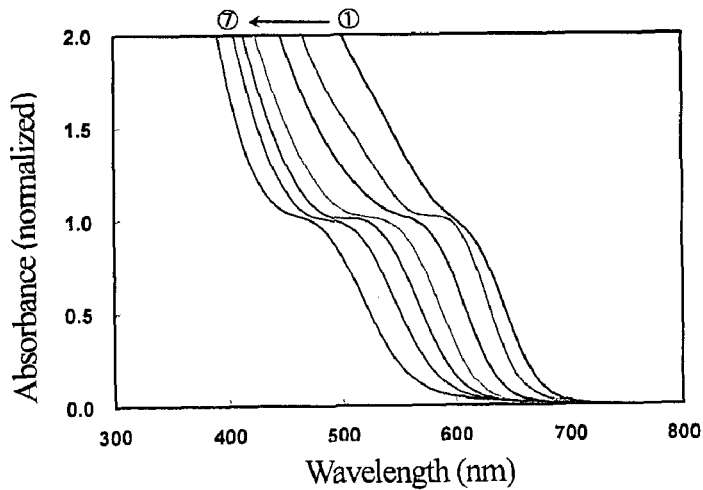
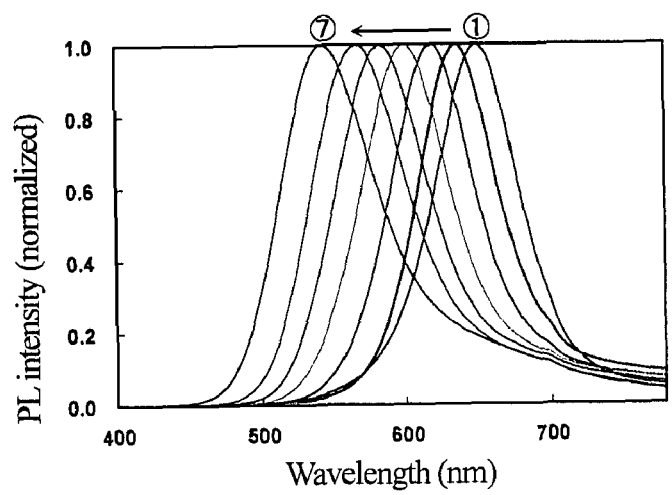

[Fig. 7]
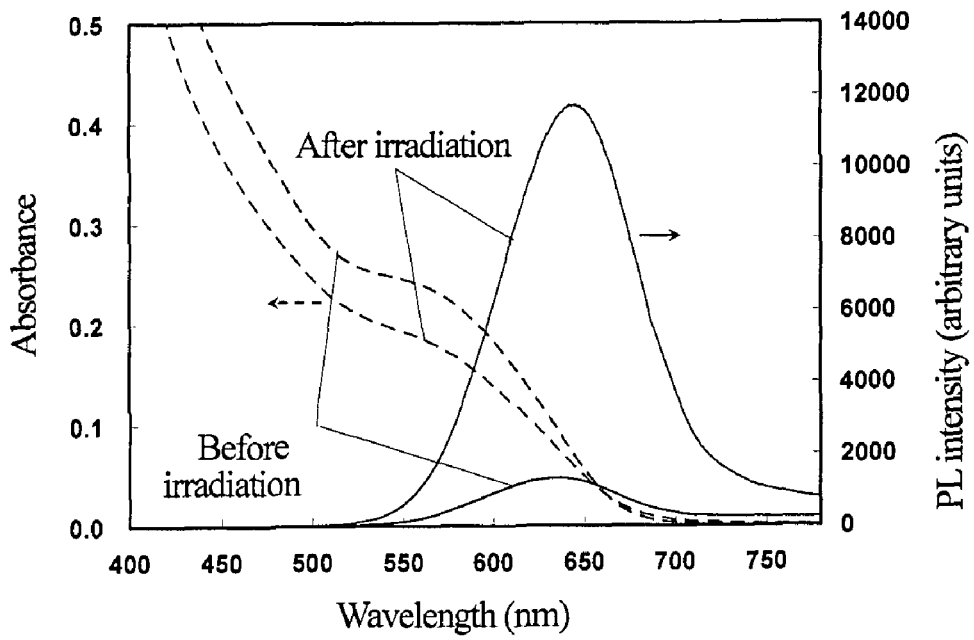
[Fig. 8]
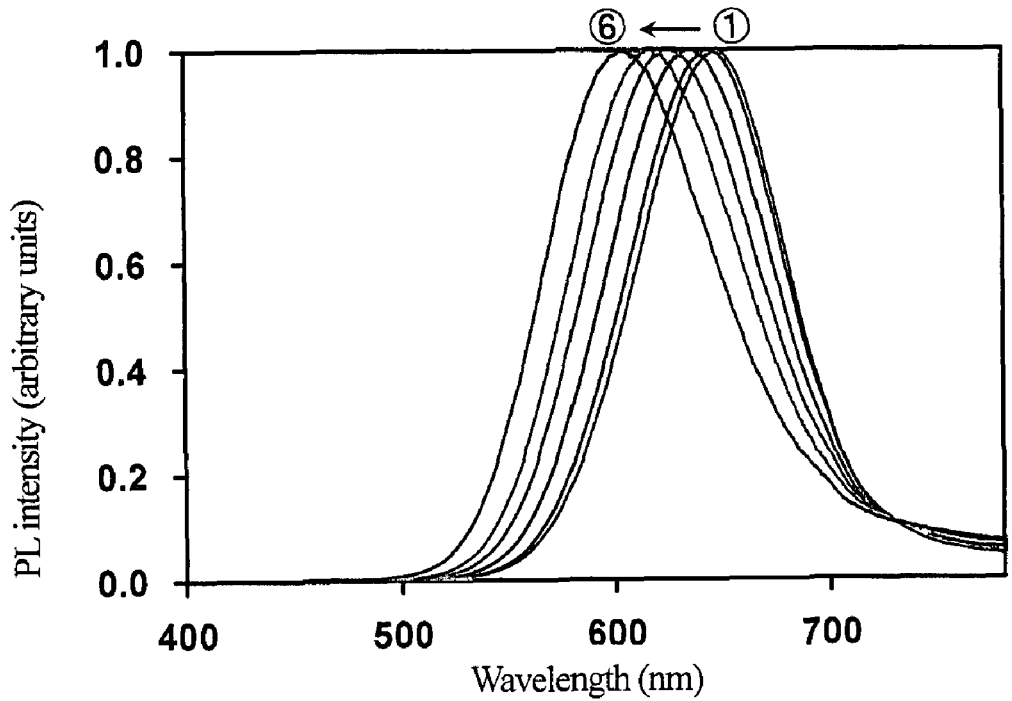

[Fig. 9]
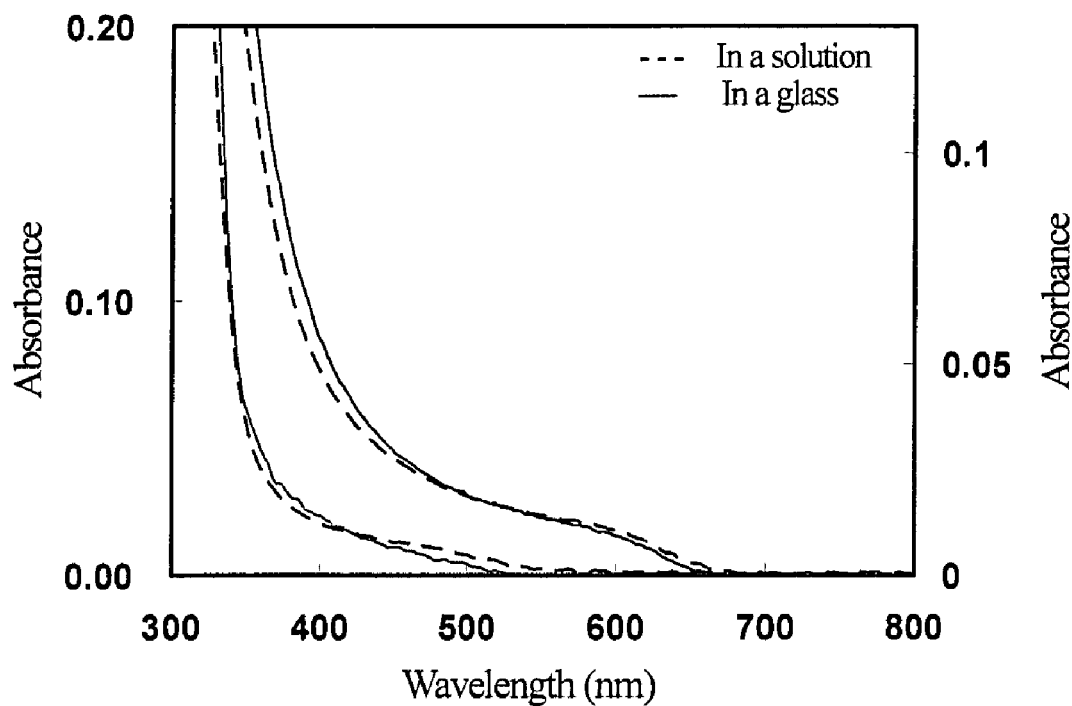
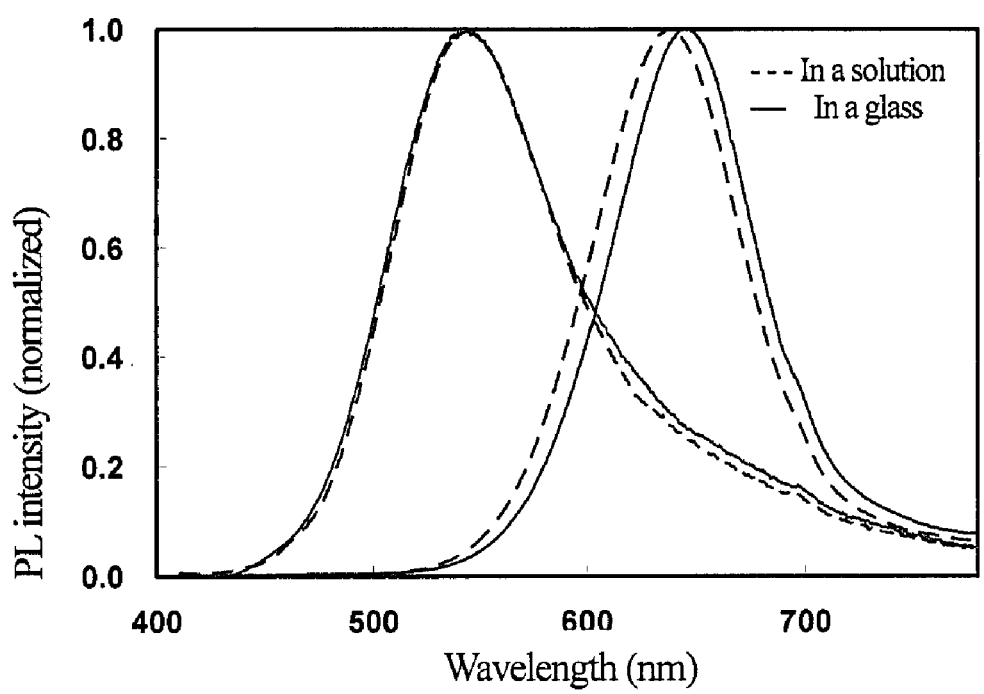

[Fig. 10]
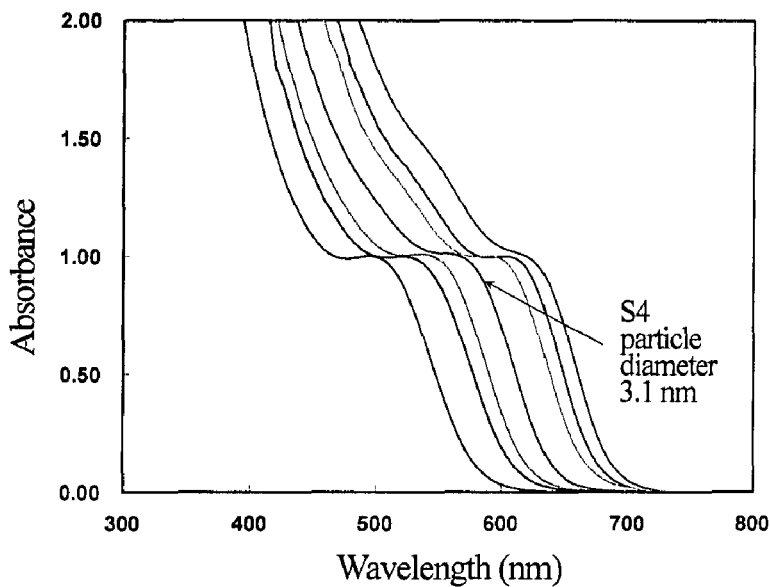
[Fig. 11]
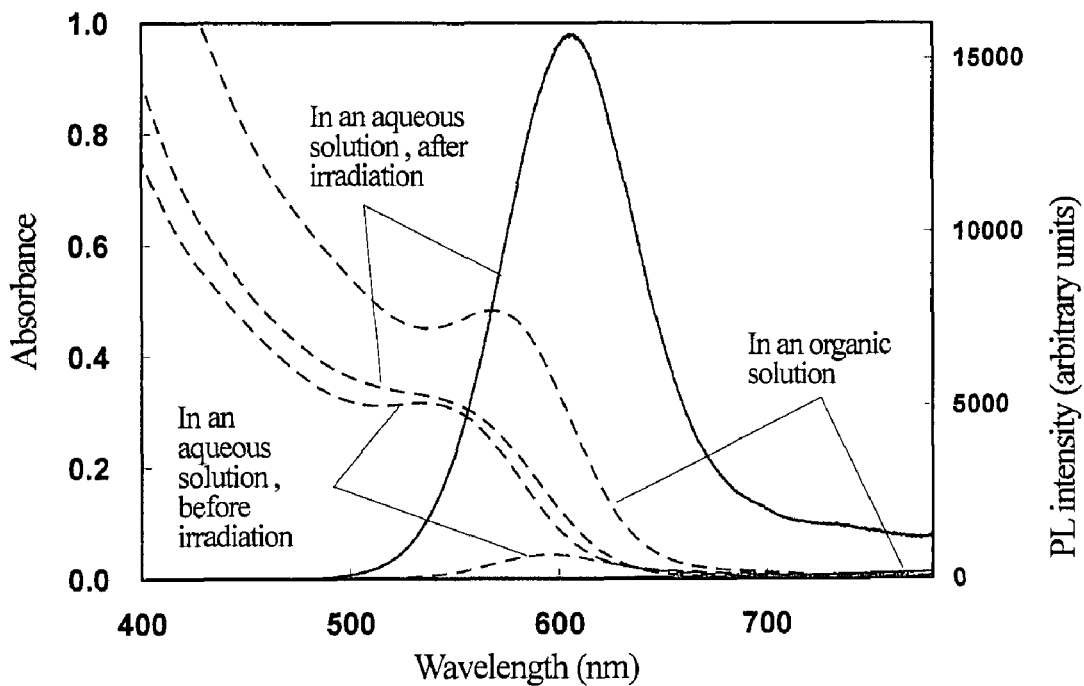

[Fig. 12]
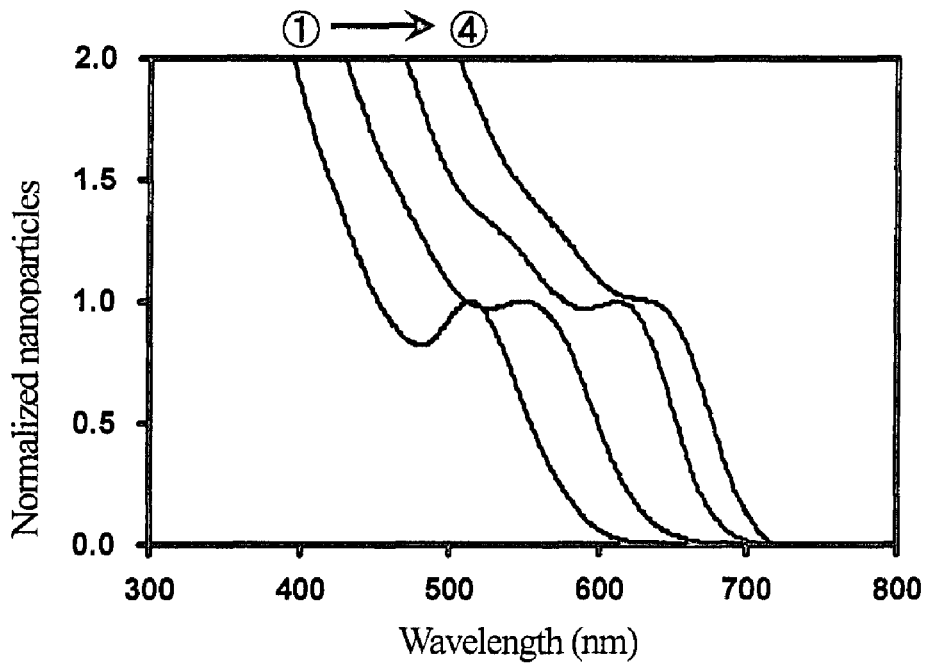
[Fig. 13]
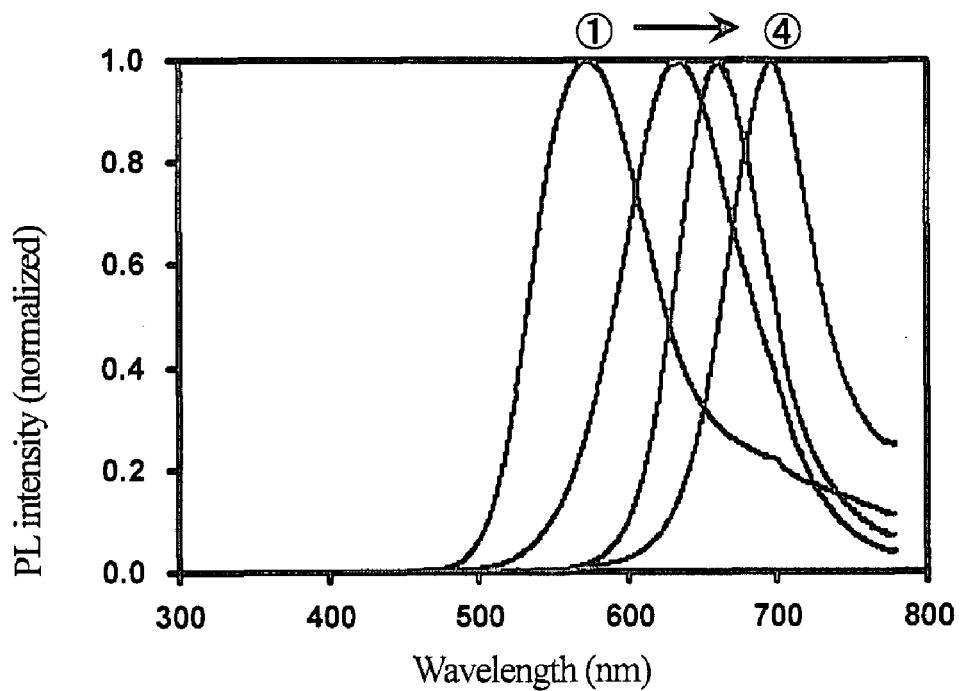

[Fig. 14]
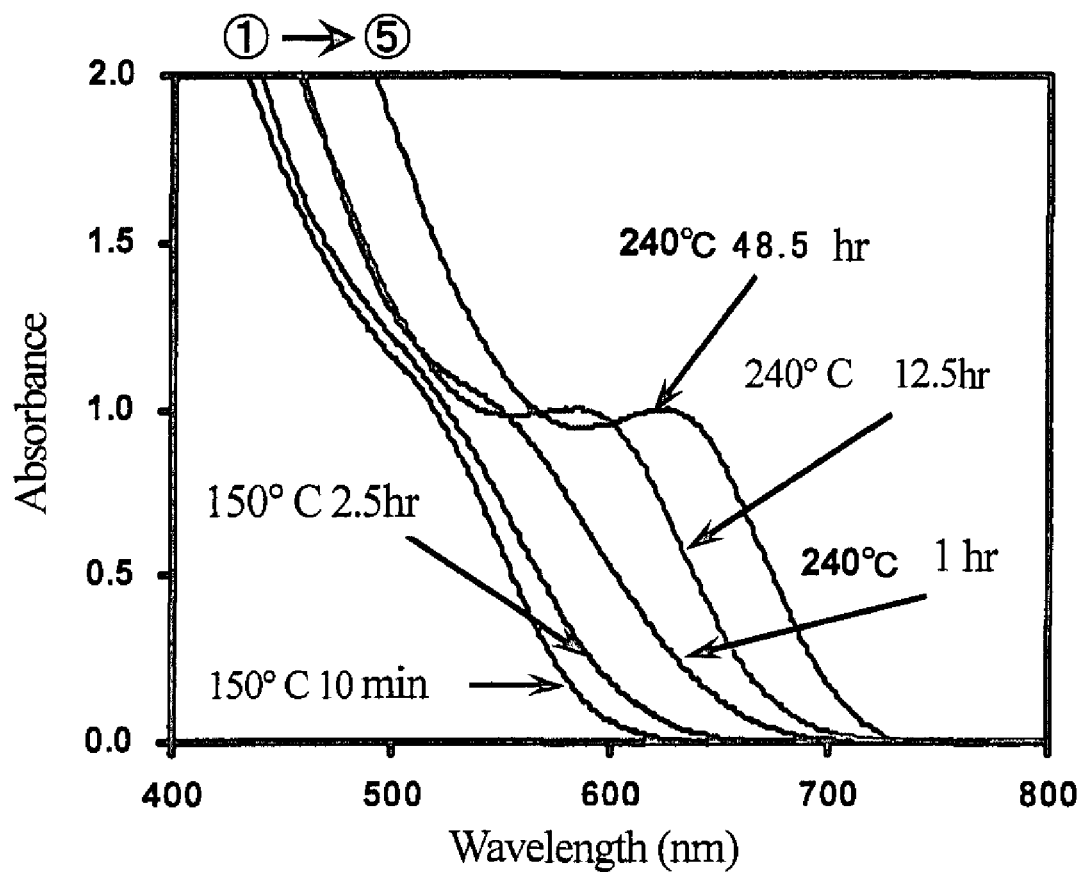

[Fig. 15]
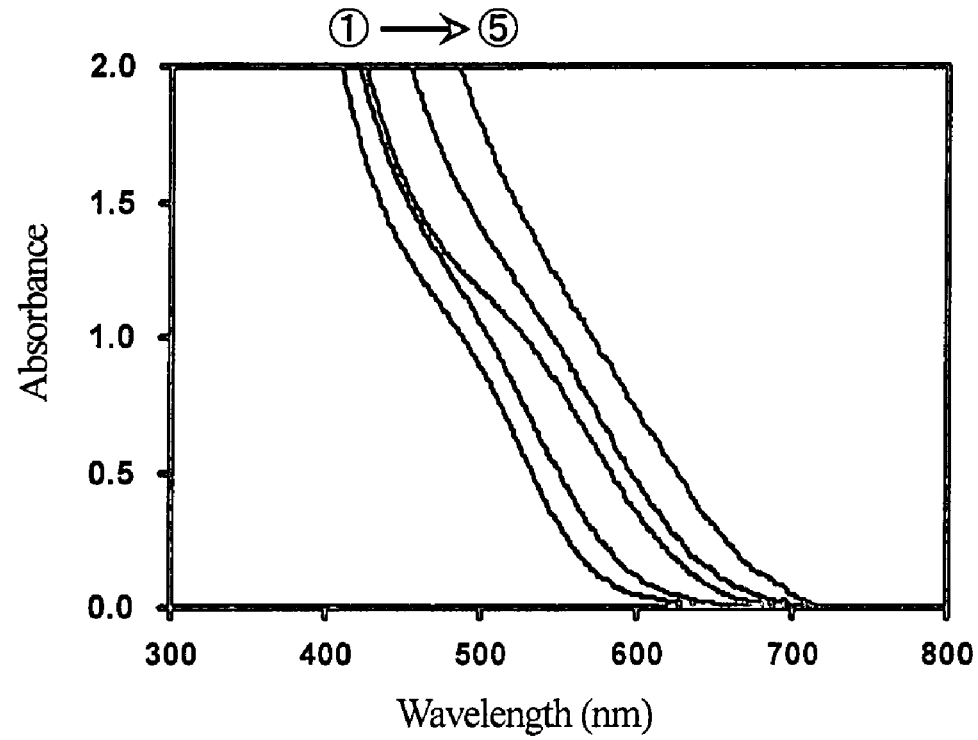
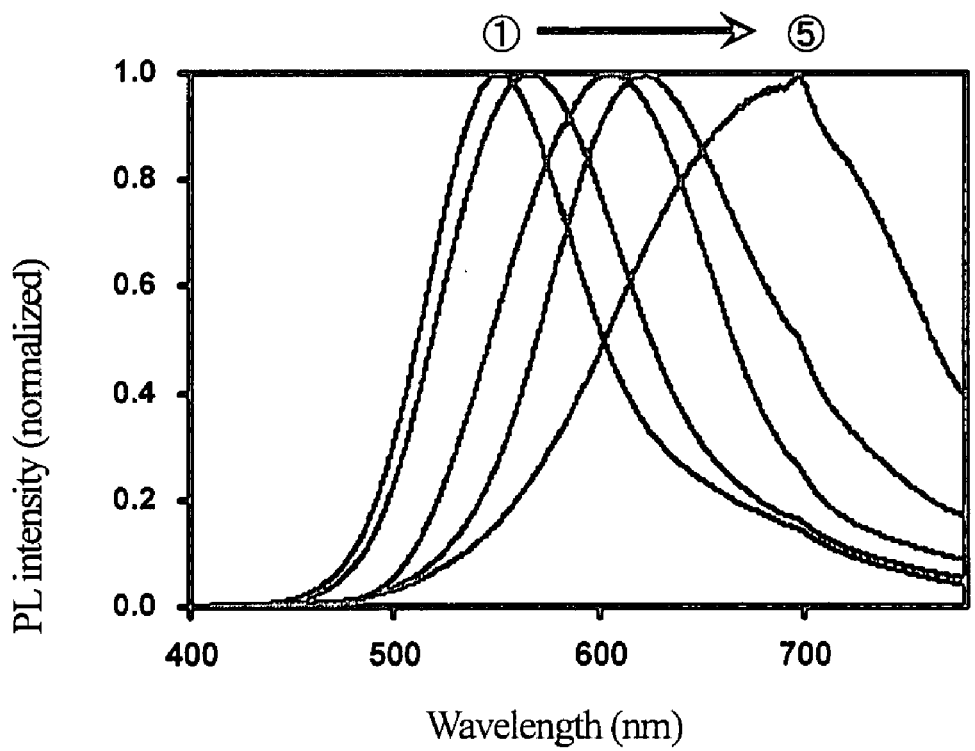

[Fig. 16]
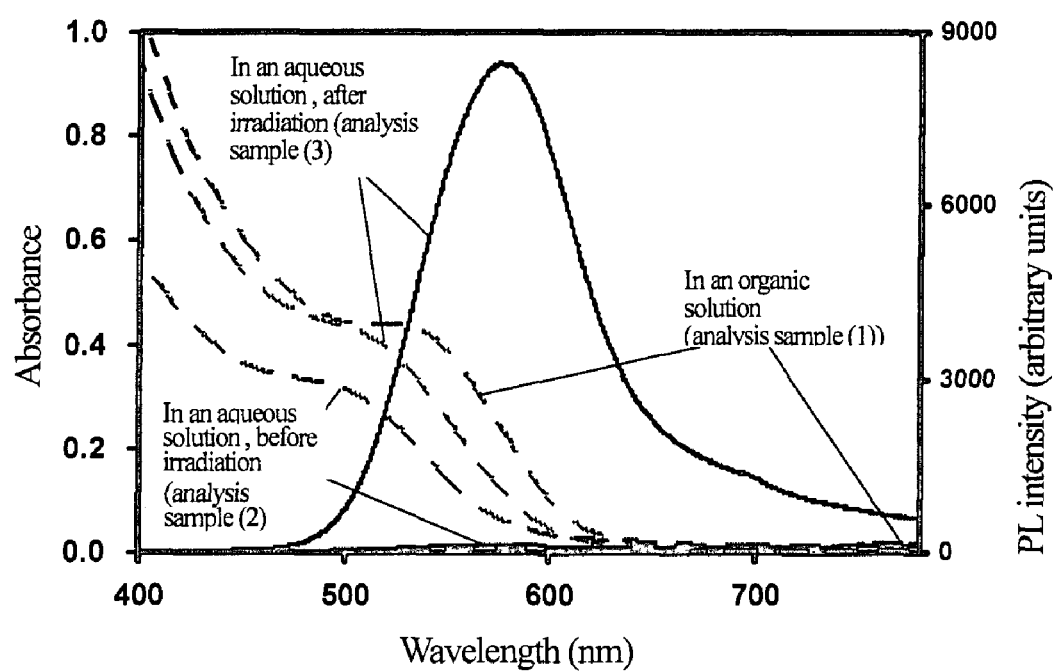

[Fig. 17]
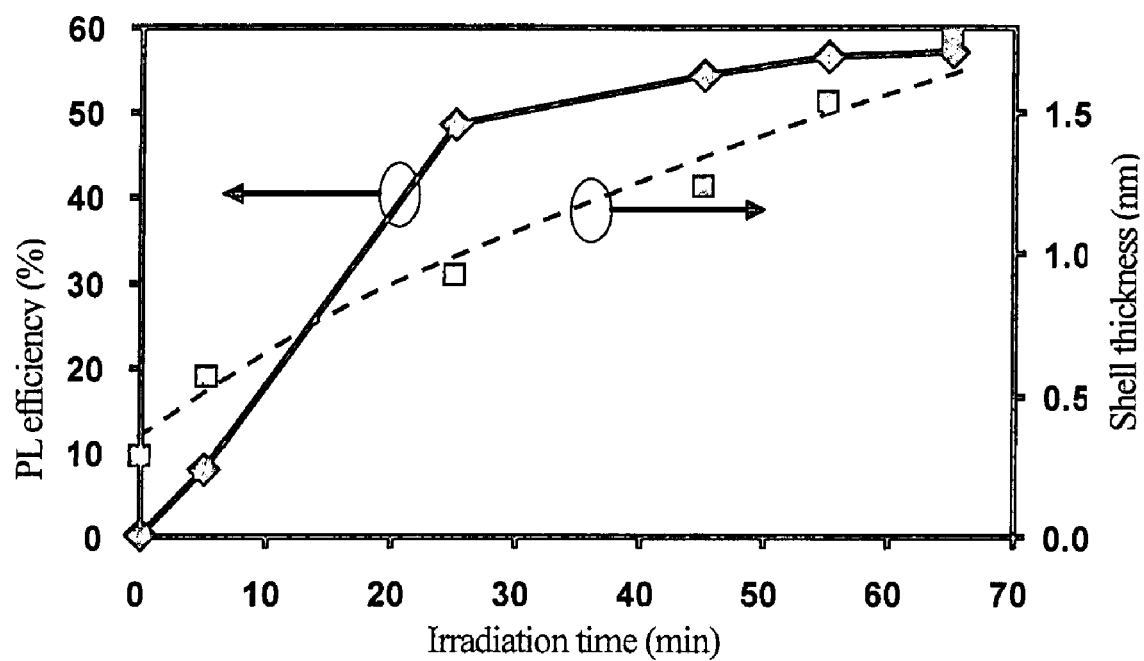

WATER-DISPERSIBLE NANOPARTICLES HAVING HIGH LUMINOUS EFFICIENCY AND METHOD OF PRODUCING THE SAME

TECHNICAL FIELD

The present invention relates to core/shell structured nanoparticles having a high photoluminescence (PL) efficiency, the nanoparticles capable of being dispersed in water, a method of producing the nanoparticles, a fluorescent material in which the nanoparticles are dispersed, and a light-emitting device using the fluorescent material.

BACKGROUND ART

Typical examples of fluorescent semiconductor nanoparticles currently known are nanoparticles of II-VI semiconductors and III-V semiconductors, which have a diameter of about 1.5 to about 15 nm. These semiconductor nanoparticles are produced by the solution method, and have been actively researched as a new type of fluorescent material. These particles have so-called "quantum size effects". That is, even if made of the same material, the smaller particles have a wider band gap, and thus emit shorter wavelengths of light.

Such nanoparticles have the following three notable characteristics:
1. Due to their high proportion of surface atoms, the nanoparticles are prone to aggregate, unless covered appropriately.
2. Because the nanoparticles have many defects on their surface, a high PL efficiency cannot be obtained unless the defects are carefully removed.
3. Water-dispersibility is very important to cover the nanoparticles with glass by a sol-gel process, or to use the nanoparticles as a biological fluorescent probe.

To produce a material more advantageous for application, based on the understanding of these three characteristics, the surface design of the nanoparticles is very important.

An examination of the history of semiconductor nanoparticle research shows that most of the research studies conducted thus far have concerned II-VI semiconductors. CdS nanoparticles in a glass were reported as early as 1926 (Non-Patent Document 1). Later, around 1982, CdS nanoparticles were produced by a reaction in a colloidal solution, and discussions began regarding the physical properties thereof, such as luminescence (Non-Patent Document 2).

Thereafter, for a certain period of time, German research groups conducted a number of research studies. Further, in first half of the 1990's, many attempts were made to produce nanoparticles in glass, not in a colloidal solution (Non-Patent Documents 3 and 4). Later, around 1997, two American research groups produced CdSe nanoparticles with a narrow particle size distribution and a high PL efficiency by a method comprising thermally decomposing an organometallic compound in an organic solvent under a substantially water- and oxygen-free atmosphere. This brought a great deal of attention to research in this field (Non-Patent Documents 5 and 6).

It is generally known that covering nanoparticles with another semiconductor material having a large band gap remarkably increases the PL efficiency. ZnSe or ZnS is preferably used as a semiconductor layer for covering CdSe. The inner semiconductor (CdSe in the above example) is called a "core", whereas a semiconductor for coating the inner semiconductor (ZnSe or ZnS in the above example) is called a "shell"; and the entire structure such as a CdSe/ZnS nanoparticle structure is called a "core/shell structure".

The present inventors devoted their attention to a simple and easy method using water as a solvent in place of an organic solvent, and succeeded in synthesizing CdTe nanoparticles with a high PL efficiency (Non-Patent Document 7, Patent Document 1). In this method, CdS is a shell and covered on its outer surface with thioglycolic acid (TGA) to provide high water dispersibility.

Because Cd has a high toxicity, research was also conducted for the replacement of Cd with Zn. A method comprising irradiation with UV light in an aqueous solution containing a surfactant and zinc ion was reported to be effective to obtain high PL efficiency and water dispersibility (Non-Patent Document 8, Patent Document 2).

However, such II-VI semiconductors have strong ionic bonding character, and therefore have unsatisfactory durability. Furthermore, semiconductors with a high PL efficiency have a defect in that they contain toxic metals, such as Cd and Hg. In contrast, III-V semiconductors have strong covalent bonding character and are therefore satisfactorily durable. However, compared to II-VI semiconductors, it is difficult to produce III-V semiconductors; high temperature and high pressure conditions are required. For this reason, much less research has been conducted on III-V semiconductors than on II-VI semiconductors. However, several attempts have been made in the last 6 to 7 years.

First, it was found that InP nanoparticles treated with hydrofluoric acid emit light (Non-Patent Document 9). To achieve a high PL efficiency with high reproducibility, a method comprising treatment with hydrofluoric acid while applying light was developed as an improvement of this method (Non-Patent Document 10). In a similar year, it was also found that covering the surface of InP with ZnS, as in the case of II-VI, also increases the PL efficiency (Non-Patent Document 11). Attempts were also made to cover InAs with various shell materials (Non-Patent Document 12). According to the research studies conducted thus far, III-V nanoparticles were dispersed in an organic solvent, and the PL efficiency was about 50% at most. When treating nanoparticles with hydrofluoric acid, water containing hydrogen fluoride was usually added in an amount of about 10 volume % to an organic solvent, and water-dispersible III-V nanoparticles were not obtained at this level of prior art method.

Recently, water-dispersible nanoparticles were produced by bonding TGA molecules to the outer surface of InP/ZnS core/shell structured nanoparticles (Non-Patent Document 13). In this method, the PL efficiency of nanoparticles before bonding of TGA molecules thereto was reportedly 15%. The PL efficiency of nanoparticles to which TGA molecules have been bonded is thus lower than that value. Around the same period, it was also reported that the $InAs_xP_{1-x}$/InP/ZnSe core/shell structure (wherein InP and ZnSe are the shell) covered with phospholipid can be dispersed in water, and has a PL efficiency of 3.5% (Non-Patent Document 14, Patent Document 3). Later, the same research group also reported that water-dispersible nanoparticles with a PL efficiency of 6 to 9% can be produced by using InAs nanoparticles with a diameter of 2 nm or less as a core (Non-Patent Document 15). Further, in recent years, it was reported that InP/ZnS nanoparticles produced by an improved shell production method achieves a PL efficiency of 40%, and can be transferred to water (Non-Patent Document 16). In this method, however, a high reaction temperature, i.e., about 220° C., is required.

Below are summaries of earlier patents. Patent Document 4 discloses water-dispersible, light-emitting III-V nanoparticles. Patent Document 5 states that a nanoparticle complex that can be stably maintained with a high PL efficiency in water can be obtained by forming a metal layer on the surface of III-V nanoparticles. However, these patent documents do not specifically disclose a method for obtaining a high PL efficiency; and there is no specific description about stability.

As described above, known methods of producing III-V semiconductor nanoparticles require a high temperature, i.e., 200° C. or more, and fail to disperse nanoparticles in water while high PL efficiency is maintained. Therefore, highly stable III-V nanoparticles that can be stably dispersed in water while maintaining the PL efficiency would be very advantageous for application.

Regarding the compositional ratio of the III-V nanoparticles, the Group III element/Group V element ratio has been continuously examined since the early days of nanoparticle production. An early report showed that the In/P molar ratio is in the range of 1 to 1.1 (Non-Patent Document 17). A subsequent report showed that the In/P ratio is in the range of 1 to 1.1 (Non-Patent Document 18). A later report showed In/P=1.2 (Non-Patent Document 19). These reports indicate that the molar ratio of the Group III element to the Group V element is in the range of 1 to 1.2.

CITATION LIST

[Patent Literature]
[Patent Document 1] WO 2004/065296
[Patent Document 2] Japanese Unexamined Patent Publication No. 2006-291175
[Patent Document 3] WO 2006/076290
[Patent Document 4] WO 2005/110916
[Patent Document 5] US 2006/0202167 A1
[Non-Patent Literature]
[Non-Patent Document 1] Jeckel, Zeitschrift fur Technische Physik, volume 6, page 301, 1926
[Non-Patent Document 2] Henglein, Berichte Der Bunsen-Gesellschaft fur Physikalische Chemie, volume 86, page 301, 1982
[Non-Patent Document 3] Nogami et al., Journal of American Ceramic Society, volume 73, page 2097, 1990
[Non-Patent Document 4] Ekimov, Journal of Luminescence, volume 70, page 1, 1996
[Non-Patent Document 5] Bawendi et al., Journal of Physical Chemistry, volume 101, page 9463, 1997
[Non-Patent Document 6] Alivisatos et al., Journal of American Chemical Society, volume 119, page 7019, 1997
[Non-Patent Document 7] Murase et al., Chemistry Letters, volume 34, page 92, 2005
[Non-Patent Document 8] Murase et al., Colloids and Surfaces A, volume 294, page 33, 2007
[Non-Patent Document 9] Nozik et al., Applied Physics Letters, volume 68, page 3150, 1996
[Non-Patent Document 10] Weller et al., The Journal of Physical Chemistry B, volume 106, page 12659, 2002
[Non-Patent Document 11] Weller et al., ChemPhysChem, vol. 2, page 331, 2001
[Non-Patent Document 12] Vanin et al., Journal of the American Chemical Society, volume 122, page 9692, 2000
[Non-Patent Document 13] Prasad et al., Journal of the American Chemical Society, volume 127, page 11364, 2005
[Non-Patent Document 14] Bawendi et al., Journal of the American Chemical Society, volume 127, page 10526, 2005
[Non-Patent Document 15] Bawendi, Journal of the American Chemical Society, volume 128, page 2526, 2006
[Non-Patent Document 16] Penn et al., Journal of the American Chemical Society, volume 129, page 15432, 2007,
[Non-Patent Document 17] Alivisatos et al., The Journal of Physical Chemistry B, volume 100, page 7212 (1996)
[Non-Patent Document 18] Nozik et al., Journal of Physical Chemistry, volume 104, page 12149 (2000)
[Non-Patent Document 19] Qian et al., Journal of Applied Physics, volume 95, page 3683 (2004)

SUMMARY OF INVENTION

Technical Problem

The present invention has been made in view of the above problems of the prior art. A primary object of the invention is to provide nanoparticles containing a III-V semiconductor as a main component, and having a high PL efficiency in an aqueous solution; and a method of producing the nanoparticles. Anther object of the present invention is to provide a fluorescent material comprising the semiconductor nanoparticles retained in a glass matrix, a light-emitting device using the fluorescent material, and a method of production thereof.

Solution to Problem

To achieve the above object, the present inventors carried out extensive research. As a result, the inventors found that when a dispersion of III-V semiconductor nanoparticles in an organic solvent is brought into contact with an aqueous solution containing a Group II element-containing compound and a Group VI element-containing compound, some of the Group III and V elements of the surface of the III-V semiconductor nanoparticles are replaced with Group II and VI elements, respectively, thus resulting in a dispersion in the aqueous solution. In particular, when a surfactant containing a Group VI element is used as a Group VI compound, the surfactant is bound to the surface of the nanoparticles, thereby increasing the water dispersibility. The inventors further found that a II-VI semiconductor layer is formed on the surface of III-V semiconductor nanoparticles by irradiation of the nanoparticles with light, thus providing nanoparticles with a core/shell structure.

Compared to known III-V semiconductor nanoparticles, the nanoparticles formed by the method described above have a specific composition containing a Group III element in a high proportion, and has excellent PL efficiency in water. The present invention has been accomplished based on these findings.

More specifically, the present invention provides the following water-dispersible nanoparticles, production methods thereof, and use of the nanoparticles.

1. Nanoparticles having a core/shell structure consisting of a core comprising a Group III element and a Group V element at a molar ratio of the Group III element to the Group V element in the range of 1.25 to 3.0, and a shell comprising a Group II element and a Group VI element and having a thickness of 0.2 nm to 4 nm, the nanoparticles having a PL efficiency of 10% or more and a diameter of 2.5 to 10 nm.
2. The nanoparticles according to item 1, wherein the molar ratio of the Group III element to the Group V element is in the range of 1.28 to 2.3.
3. The nanoparticles according to item 1 or 2, comprising at least one Group III element selected from the group consisting of In, Ga and Al, and at least one Group V element selected from the group consisting of N, P, As and Sb.
4. The nanoparticles according to any one of items 1 to 3, comprising a Group II element and a Group VI element at a molar ratio of the Group VI element to the Group II element in the range of 0.75 to 1.3.

5. The nanoparticles according to item 4, comprising at least one Group II element selected from the group consisting of Zn, Cd and Hg, and at least one Group VI element selected from the group consisting of S, Se, and Te.

6. The nanoparticles according to any one of items 1 to 5 comprising InP as the core and ZnS as the shell, wherein when the diameter of the nanoparticles is defined as D (as expressed in nanometers) and the molar ratio of the Group II element to the Group III element is defined as y, D and y satisfy all the following conditions (1) to (3):

[Math. 1]

$$1.24 \times 0.67 \times \left\{ \left(1 + \frac{2 \times 0.6}{D - 2 \times 0.6}\right)^3 - 1 \right\} \leq \quad (1)$$

$$y \leq 1.24 \times 0.9 \times \left\{ \left(1 + \frac{2 \times 3.0}{D - 2 \times 3.0}\right)^3 - 1 \right\}$$

$$y \leq 1.24(D^3 - 1) \quad (2)$$

$$2.5 \leq D \leq 10. \quad (3)$$

7. The nanoparticles according to any one of items 1 to 6, which have a PL efficiency of fluorescence of 50% or more.

8. The nanoparticles according to any one of items 1 to 7, which can be dispersed in water.

9. The nanoparticles according to item 8, wherein a thiol group of a thiol group- and carboxyl group-containing surfactant is bound to the nanoparticles.

10. A method of producing the water-dispersible nanoparticles of any one of items 1 to 7, comprising the steps of:

(1) bringing a dispersion containing III-V semiconductor nanoparticles in an organic solvent into contact with an aqueous solution containing a Group II element-containing compound and a Group VI element-containing compound to transfer the III-V semiconductor nanoparticles in the organic solvent dispersion to the aqueous solution; and (2) irradiating the aqueous solution with light having a wavelength of 300 to 600 nm after the III-V semiconductor nanoparticles have been transferred to the aqueous solution in step (1).

11. The method according to item 10, wherein the III-V semiconductor nanoparticles are obtained by reacting a compound having a portion at which two types of Group V atoms are directly bonded, with a Group III element-containing compound by a solvothermal method.

12. The method according to Item 10 or 11, wherein the Group VI element-containing compound is a surfactant containing a Group VI element.

13. A fluorescent material comprising the nanoparticles of any one of items 1 to 9 dispersed in a matrix containing silicon oxide as a constituent.

14. The fluorescent material according to item 13, wherein the matrix containing silicon oxide is a glass material formed by a sol-gel process using an organoalkoxysilane as a starting material.

15. A light-emitting device comprising the fluorescent material of item 13 or 14 as a light source.

The method of producing water-dispersible nanoparticles having a high PL efficiency, and nanoparticles obtained by the method are described below.

Method of Producing Water-Dispersible Nanoparticles (1) III-V Semiconductor Nanoparticle-Production Step:

A primary source of Group V elements of III-V nanoparticles has been an organic substance having silicon and a Group V element bonded thereto. When such an organic substance is heated and decomposed in a coordinating solvent, nuclei are first generated, after which particles are grown, thus forming nanoparticles (the hot soap method). For example, tris(trimethylsilyl)phosphine (P[Si(CH$_3$)$_3$]$_3$) has been used as a source of phosphorus as a Group V element. This compound is highly expensive (for example, the price of a product of Strem Chemicals, Inc. is about 11,000 yen per gram), highly toxic, and unstable. Moreover, this compound spontaneously combusts in air and is thus difficult to handle. Yamaguchi et al. attempted to replace this compound with other compounds (Chemistry Letters, volume 33, page 1494 (2004)). In this attempt, an organic substance having nitrogen and Group V element bonded thereto was used as a source of phosphorus. More specifically, InP nanoparticles were synthesized by decomposing tris(dimethylamino)phosphine (P[N(CH$_3$)$_2$]$_3$) by heating at 345° C. This compound costs at most ⅒ the price of tris(trimethylsilyl)phosphine (for example, 5 g of a product of Strem Chemicals, Inc. costs 3,600 yen; 25 grams of a product of Wako Pure Chemical Industries, Ltd. costs 9,500 yen), has low toxicity, and is easy to handle. However, the obtained InP nanoparticles have a size distribution of about 50%, which is relatively wide, and emit weak light with a wide spectral band.

According to the present invention, although III-V nanoparticles obtained by the hot soap method can be used, the solvothermal method described below is more advantageously used to produce III-V nanoparticles at low cost with high safety in a simple manner. This method is described below.

The solvothermal method is one of the methods for producing nanoparticles. This method comprises placing a solvent in a pressure-resistant vessel (autoclave) and heating at a temperature not lower than the boiling point of the solvent to produce the desired product. Among the solvothermal methods, the method using water as a solvent is particularly known as a hydrothermal method. According to this solvothermal method, high-pressure conditions are used to increase the solubility and promote the reaction, thus producing nanoparticles at a lower temperature.

According to the present invention, in particular, III-V nanoparticles can be produced at relatively low temperatures when a compound having a portion at which two types of Group V atoms are directly bonded is used as a source of a Group V element, and the solvothermal method is performed. The solvothermal method temperature is about 100° C. to about 300° C., more preferably about 120° C. to about 200° C., and further preferably about 150° C. to about 180° C.

Examples of compounds having a portion at which two types of Group V atoms are directly bonded include compounds represented by the general formula:

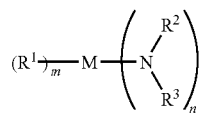

wherein M is a Group V element, R$^1$, R$^2$, and R$^3$ may be the same or different and each represents a lower alkyl group, such as methyl, ethyl, n-propyl, isopropyl, butyl, tert-butyl, or the like, m is an integer of 0 to 2, n is an integer of 1 to 3, and m+n=3. Specific examples of compounds represented by the above general formula include the following:

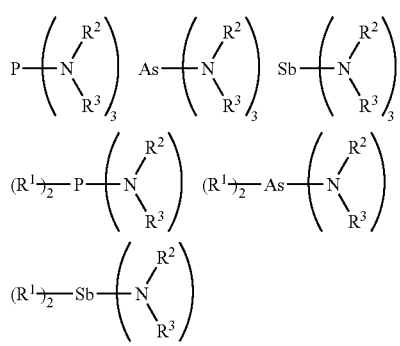

The source of a Group III element is not particularly limited, and specific examples thereof include Group III metals such as In, Ga and Al; and chlorides, oxides, carbonates, and acetates of these metals. Such Group III elements can be used singly or in a combination of two or more.

Examples of solvents include hydrophobic polar organic solvents such as toluene and chloroform.

Nanoparticles having a narrow size distribution can be easily obtained by adding a poor solvent such as alcohol to nanoparticles obtained by the above method (size-selective precipitation method). The size-selective precipitation method comprises gradually adding a poor solvent, such as alcohol, to nanoparticles dispersed in a good solvent in such a manner that particles with a low solubility (i.e., usually larger particles) are the first to precipitate, whereby the particles are gradually precipitated and classified according to the particle size. The nanoparticles thus obtained usually have a particle diameter in the range of about 1.5 to about 6 nm. To increase the PL efficiency, a shell layer is further formed on the surface of this core by the method described below.

There have been several reports on the relationship between the conditions in which nanoparticles are produced and the composition of the resulting nanoparticles. One report shows that when the solvothermal method was performed using indium chloride and sodium phosphide as starting materials, the molar ratio of the Group III element (indium) to the Group V element (phosphorus) was 1.2. Since the 1990s, many studies have been conducted regarding the synthesis of indium phosphide using the hot soap method. In most cases, tris(trimethylsilyl)phosphine was used as a source of phosphorus, and the molar ratio of the Group III element (indium) to the Group V element (phosphorus) was reported to be in the range of 1.0 to 1.1. In a reaction using arsenic in place of phosphorus, tris(trimethylsilyl)arsine can be used as a source of arsenic; in this case, the molar ratio of the Group III element (indium) to the Group V element (arsenic) has been reported to be about 1.0. In contrast, when the production method described in the present specification is performed, many Group III atoms are arranged on the surface of nanoparticles. When the Group III-VI element-containing core is coated with a Group II-VI element-containing shell to increase the PL efficiency, the above-mentioned state of the particle surface may affect the properties of the shell.

(2) Process of Forming Core/Shell Structured Nanoparticles:
(i) Mixture Preparation Step Subsequently, the organic solvent dispersion containing III-V semiconductor nanoparticles obtained by the above method is brought into contact with an aqueous solution containing a Group II element-containing compound and a Group VI element-containing compound. This contact is made in a state in which a surfactant is dispersed in the aqueous phase. Water-dispersible molecules containing a Group VI element are advantageously used as the surfactant. An example of such a surfactant is thioglycolic acid. When thioglycolic acid is used as the surfactant, the sulfur atom at one end of the molecule is bonded to the surface of the nanoparticle, whereas the carboxyl group at the other end thereof is ionized in the neutral to alkaline region, thus contributing to the stable dispersion of nanoparticles in water. In addition to the surfactant, other compounds containing a Group VI element may also be added.

This step causes partial elimination of Group III and V ions from the surface of the III-V semiconductor, resulting in substitution of these ions with Group II and VI ions in the aqueous solution and bonding of the surfactant to the nanoparticle surface. As a result, the nanoparticles contained in the organic solvent dispersion become hydrophilic and transferred to the aqueous phase, resulting in a dispersion of III-V semiconductor nanoparticles in the aqueous phase. In the above reaction, thiol, amine, amino acid or the like can be used as the surfactant. When a thiol is used, sulfur contained therein is a Group VI element. Therefore, the amount of other Group VI elements can be reduced. Examples of thiols include thioglycolic acid, thioglycerol, 2-mercaptoethylamine, 3-mercaptopropionic acid, mercaptosuccinic acid, and the like.

In the dispersion of III-V semiconductor nanoparticles in an organic solvent, the organic solvent may be, for example, a hydrophobic polar organic solvent, such as toluene or chloroform. "Hydrophobic polar organic solvent" refers to a polar organic solvent having no functional group capable of forming a hydrogen bond, such as hydroxyl, carboxyl, or amino groups.

The concentration of III-V semiconductor nanoparticles in the organic solvent dispersion is not particularly limited. For example, the concentration is preferably about $0.5 \times 10^{-6}$ mol/l to about $10 \times 10^{-6}$ mol/l, more preferably about $1 \times 10^{-6}$ mol/l to about $6 \times 10^{-6}$ mol/l, and even more preferably about $2 \times 10^{-6}$ mol/l to about $3 \times 10^{-6}$ mol/l.

The organic solvent dispersion used herein may be an organic solvent dispersion of III-V semiconductor nanoparticles obtained by a known hot soap method or a solvothermal method, as described above. Alternatively, the III-V semiconductor nanoparticles obtained by the hot soap method or solvothermal method may be further isolated from the organic solvent, and dispersed again in an organic solvent.

The Group II element-containing compound to be contained in the aqueous solution may be, for example, a water-soluble compound containing at least one Group II element, such as Zn, Cd or Hg. Examples of such water-soluble compounds include perchlorates, chlorides, and nitrates.

The concentration of Group II ions in the aqueous solution is preferably about 0.01 to about 0.3 mol/l, more preferably about 0.05 to about 0.2 mol/l, and still more preferably about 0.065 to about 0.15 mol/l.

The Group VI element-containing compounds may be, for example, a water-soluble compound containing at least one Group VI element, such as S, Se or Te. Examples of such water-soluble compounds include thioglycolic acid, 3-mercaptopropionic acid, sodium sulfide, sodium hydrogen sulfide (NaSH), and the like. Examples of selenium-containing compounds and tellurium containing compounds are similar to the above.

The concentration of the Group VI element in the aqueous solution is preferably about 0.01 to about 0.8 mol/l, more preferably about 0.05 to about 0.5 mol/l, and still more preferably about 0.15 to about 0.4 mol/l.

The molar ratio of the Group VI element to the Group II element in the aqueous solution is preferably about 1.5 to about 4.0, more preferably about 1.8 to about 3.0, and still more preferably about 1.9 to about 2.5.

When the surfactant is a thiol, the thiol is added in such an amount that the total amount of thiol and other Group VI elements used will achieve the above-mentioned ratio. Examples of such thiols include thioglycolic acid, thioglycerol, 2-mercaptoethylamine, 3-mercaptopropionic acid, mercaptosuccinic acid, and the like. The surfactant enhances the dispersibility of nanoparticles in water.

The aqueous solution of a Group II element-containing compound and a Group VI element-containing compound preferably has a pH of about 5 to about 12, more preferably about 6.5 to about 11.5, and still more preferably about 9 to about 10.

The method of bringing the organic solvent dispersion of III-V semiconductor nanoparticles into contact with the aqueous solution of a Group II element-containing compound and a Group VI element-containing compound is not particularly limited, and may be any method by which either one of the organic solvent dispersion or the aqueous solution is added to the other in a container. Upon contact, the reaction proceeds at the interface between the organic solvent dispersion and the aqueous solution. The reaction can be promoted by fully mixing the organic solvent dispersion and the aqueous solution.

The volume ratio of the organic solvent dispersion of III-V semiconductor nanoparticles to the aqueous solution of a Group II element-containing compound and a Group VI element-containing compound is preferably in the range of about 0.2 to about 5, and more preferably about 0.7 to about 1.3.

The liquid temperature when mixed is preferably in the range of about 15° C. to about 80° C., more preferably about 30° C. to about 65° C., and most preferably about 45° C. to about 55° C.

(ii) Light Irradiation Step:

After the III-V semiconductor nanoparticles are transferred to the aqueous phase by the above-mentioned method to form a dispersion of the nanoparticles in the aqueous phase, the aqueous phase is irradiated with light. In this step, a reaction between the Group II and VI elements in the aqueous solution occurs on the surface of III-V semiconductor nanoparticles, thus forming a II-VI semiconductor layer. This step is actually a competitive reaction between dissolution of nanoparticles by light irradiation and supply of Group II and VI ions from the solution. The reaction erases the surface of III-V nanoparticles as a core and simultaneously forms a new II-VI layer thereon, thus producing core/shell structured nanoparticles. As a result of this step, the nanoparticles contain a Group III element in a higher proportion than a Group V element. This step greatly enhances the PL efficiency and produces water-dispersible nanoparticles having a high PL efficiency.

When thioglycolic acid is used as a Group VI element-containing compound, thioglycolic acid acts as a source of sulfur as a Group VI element, and is also bonded to the surface of the shell formed, thus imparting high water dispersibility to nanoparticles due to the presence of a carboxyl group. Even when other thiols (e.g., thioglycolic acid, thioglycerol, 2-mercaptoethylamine, 3-mercaptopropionic acid, mercaptosuccinic acid, etc.) are used, a similar mechanism works to achieve stabilization.

To increase the PL efficiency by light irradiation, irradiation light may be any light within the range of wavelengths absorbed by nanoparticles. However, an excessively short wavelength is not preferable because the light is absorbed by the solvent and surfactant. An overly small light absorption is also not preferable, because the reaction takes time. It is usually preferable to use light having a wavelength of about 300 to about 600 nm, more preferably about 320 to about 500 nm, and further preferably about 330 to about 400 nm.

The intensity of irradiation light is preferably about 0.1 to about 6 W/cm$^2$, more preferably about 1 to about 5 W/cm$^2$, and still more preferably about 3 to about 4.5 W/cm$^2$.

Although the duration of light irradiation time depends on the irradiation intensity, it is usually about 1 minute to about 12 hours, preferably about 20 minutes to about 5 hours, and more preferably about 30 minutes to about 2 hours.

The light irradiation greatly enhances the PL efficiency of the nanoparticles, and may achieve a PL efficiency of more than 70%.

The core/shell structured nanoparticles whose core contains III-V semiconductor nanoparticles and whose shell contains a II-VI semiconductor, obtained by the above method, can be purified by adding a poor solvent such as an alcohol to precipitate the nanoparticles. It is also possible to redisperse the purified nanoparticles in water.

The addition of a poor solvent and the classification of the nanoparticles by the size-selective precipitation method may be performed either before transfer to the aqueous phase or immediately before or immediately after light irradiation. Performing the classification after transfer to the aqueous phase (immediately before or immediately after light irradiation) tends to suppress the surface oxidation more effectively, thus providing a higher PL efficiency.

Water-Dispersible Nanoparticles Having a High PL Efficiency

The water-dispersible nanoparticles with high PL efficiency obtained by the above method have a core/shell structure in which the core contains a III-V semiconductor nanoparticle, and the shell contains a II-VI semiconductor.

As described in the Background Art section, the ratio of the Group III element to the Group V element in known III-V semiconductor nanoparticles produced in an organic solvent is in the range of about 1 to about 1.2. Compared to known III-V semiconductor nanoparticles, the water-dispersible nanoparticles of the present invention have a specific composition containing a higher proportion of Group III element. More specifically, to achieve a high PL efficiency in water, the water-dispersible nanoparticles of the present invention have a composition such that the molar ratio of the Group III element to the Group V element is in the range of 1.25 to 3.0. To achieve a higher PL efficiency, the ratio is more preferably in the range of about 1.28 to about 2.3, and most preferably about 1.29 to about 2.0.

The molar ratio of the Group III element to the Group V element referred to herein is a value obtained by analysis using an electron probe microanalyzer (EPMA). Reference substances provided by the manufacturer of the analyzer are often used to determine the molar ratio. More specifically, when the analysis sample is a III-V semiconductor InP, an InP reference rod is used. For more precise measurement, about 10 mg of a sample having a composition similar to that of the analysis sample is prepared and used as a reference sample after the reference sample is analyzed by inductively coupled plasma spectrometry (ICP) to determine its composition. After dissolving the nanoparticles with an acid, analysis was also performed by inductively coupled plasma-atomic emission spectrometry (ICP-Atomic Emission Spectrometry, ICP-AES).

The core comprising a III-V semiconductor has a diameter of about 1.0 to about 6.0 nm, and preferably about 1.5 to about 3.0 nm.

The molar ratio of the Group VI element to the Group II element in the II-VI semiconductor contained in the shell is preferably in the range of 0.5 to 1.5, and more preferably 0.75 to 1.3. The thickness of the shell containing a II-VI semiconductor is preferably about 0.2 to about 4.0 nm, and more preferably about 1.0 to about 2.0 nm.

The core/shell structured nanoparticles whose core contains a III-V semiconductor nanoparticle and whose shell contains a II-VI semiconductor have a hydrophilic organic compound bonded to the surface of the shell as a surfactant and have excellent water dispersibility and a diameter of 2.5 to 10 nm. If the diameter is too small, the proportion of the surface is increased, resulting in difficulty in removing the defects on the surface, and lowered PL efficiency. If the diameter is too large, it becomes difficult to increase the dispersion concentration. Therefore, the diameter of the nanoparticles is preferably 3 to 8 nm, and most preferably 3.5 to 6 nm. When the nanoparticle is not a precisely spherical particle, the average of the long and short axial lengths is used as the diameter. The diameter can be easily determined by an experiment of dynamic light scattering in a solution. However, for a more precise measurement, the diameter of the particle is determined from photographic images (the magnification is at least 100,000) taken by a transmission electron microscope, and the average is calculated.

Due to the above-mentioned specific structure, the core/shell structured nanoparticles can be stably dispersed even in an solvent comprising 80 vol. % of water or more, while maintaining the high PL efficiency.

The core/shell structured nanoparticles have high PL efficiency. For various applications, the PL efficiency is preferably more than 10%. The nanoparticles described above fully achieve this PL efficiency. Furthermore, the above nanoparticles having a PL efficiency of 50% or higher in aqueous solution can be obtained, which has not been achieved by any known III-V semiconductor nanoparticles. In particular, a PL efficiency of 65% or more, or even 70% or more, can also be realized.

The wave function of the exciton in the core/shell structured nanoparticles of the invention comprising III-V semiconductor nanoparticles as a core and II-VI semiconductor nanoparticles as a shell can be calculated. The calculation shows that the electron of the exciton leaks from the core due to tunneling effects. If the shell is thin, the electron of the exciton may further leak out of the shell. When the thickness of the shell is large enough so that the leakage from the shell can almost be ignored, the obtained nanoparticles have a high PL efficiency. That is, the calculated range of shell thickness with which the leakage can be inhibited corresponds well with the experimental results. If the shell is too thick, it takes more time to produce the shell. Moreover, due to the lattice constant difference between the shell and the core, defects may occur in the shell, thus reducing the PL efficiency. For those reasons, there is an optimal shell thickness.

To make a material for practical use, nanoparticles preferably have a high PL efficiency. The following results were obtained from experiments.

When the particle diameter D of the entire core/shell structured nanoparticle (as expressed in nanometers) is in the range of $2.5 \leq D \leq 10$, the shell thickness L (as expressed in nanometers) is preferably in the range of $0.6 \leq L_1 \leq 3.0$, and such nanoparticles achieve a PL efficiency of 10% or more. The shell thickness is more preferably in the range of $0.8 \leq L_2 \leq 2.8$, and such nanoparticles achieve a PL efficiency of 30% or more. The shell thickness is most preferably in the range of $1.0 \leq L_3 \leq 2.5$, and such nanoparticles achieve a PL efficiency of 50% or more.

Since a nanoparticle is small, it is difficult to measure the core size and the shell thickness with an electron microscope after producing the nanoparticle. However, measuring the diameter D of the entire nanoparticle is easy. The molar ratio y of the Group II element to the Group III element and the diameter D of the nanoparticle preferably satisfy all the following conditions (1) to (3), in corresponding to a shell thickness in the range of $0.6 \leq L_1 \leq 3.0$:

[Math. 2]

$$1.24 \times 0.67 \times \left\{\left(1 + \frac{2 \times 0.6}{D - 2 \times 0.6}\right)^3 - 1\right\} \leq \quad (1)$$

$$y \leq 1.24 \times 0.9 \times \left\{\left(1 + \frac{2 \times 3.0}{D - 2 \times 3.0}\right)^3 - 1\right\}$$

$$y \leq 1.24\{(D/x)^3 - 1\} \quad (2)$$

$$2.5 \leq D \leq 10 \quad (3)$$

The above condition (1) is obtained by comparing the experimental results with a theoretical formula obtained from the core radius $r_0$ (as expressed in nanometers) and the shell thickness L. This is explained below in more detail.

First, when the molecular weight of the core-forming molecules is defined as $w_0$, the specific gravity thereof as $d_0$, the molecular weight of the shell-forming molecules as $w_L$, and the specific gravity thereof as $d_L$, the core volume $V_0$ can be expressed as $V_0 = 4\pi r_0^3/3$.

The shell volume $V_L$ can be expressed as $$V_L = 4\pi\{(r_0+L)^3 - r_0^3\}/3.$$

By using these formulas and Avogadro's number $N_A$, the number of core-forming molecules $N_0$ and the number of shell-forming molecules $N_L$ can be expressed as follows:

$$N_0 = N_A V_0 d_0/w_0$$

$$N_L = N_A V_L d_L/w_L$$

When the core is InP and the shell is ZnS, $w_0=145.8$, $d_0=4.8$, $w_L=97.5$, and $d_L=4.0$. Since the molar ratio ($N_L/N_O$) of the Group II element to the Group III element is defined as y, y can be expressed as $$y = N_L/N_0 = 1.24\{(1+L/r_0)^3 - 1\}.$$

Regarding the diameter D of the entire nanoparticle, since $D=2(r_0+L)$, the following formula (i) is obtained:

$$y = 1.24[\{1+2L/(D-2L)\}^3 - 1] \quad (i).$$

When the molar ratio of the Group III element to the Group V element in the Group III-V element-containing core is defined as n, the chemical formula of, for example, indium phosphide can be expressed as $In_t P_{2-t}$ by using t as a function of n. Herein, n and t have the following relationship:

$$n = t/(2-t).$$

Transformation of this formula reveals the following general relationship:

$$t = 2n/(n+1).$$

Thus, when the shell thickness is defined as L, the molar ratio y of the Group II element to the Group III element can be expressed by the following formula (ii) obtained by modification of formula (i):

$$y = 1.24 \times \{(n+1)/2n\} \times [\{1+2L/(D-2L)\}^3 - 1] \quad \text{(ii)}.$$

wherein n is preferably in the range of $1.25 \leq n \leq 3.0$. Since $0.6 \leq L_1 \leq 3.0$, the lower limit $y_1$ of y can be calculated by inserting $L=0.6$ and $n=3.0$ into the formula (ii) as follows:

$$y_1 = 1.24 \times 0.67 \times [\{1+2 \times 0.6/(D-2 \times 0.6)\}^3 - 1].$$

The upper limit $y_2$ of y can be calculated by inserting $L=3.0$ and $n=1.25$ into the formula (ii) as follows:

$$y_2 = 1.24 \times 0.9 \times [\{1+2 \times 3.0/(D-2 \times 3.0)\}^3 - 1].$$

The condition (1) ($y_1 \leq y \leq y_2$) is thus obtained.

To obtain the condition (2), calculation using $D = 2(r_0 + L)$ and the formula (i) as simultaneous equations is first made to obtain the following equation:

$$y = 1.24\{(D/2r_0)^3 - 1\}.$$

Since the core diameter must be at least 1 nm in any case, i.e., $2r_0 \geq 1.0$, the following condition (2) is obtained:

$$y \leq 1.24(D^3 - 1)$$

A small core results in a high proportion of surface atoms. Accordingly, the surface defects become predominant, and it becomes difficult to increase the PL efficiency. Therefore, $2r_0 \geq 1.5$ is preferable, and $2r_0 \geq 2.0$ is most preferable.

It was also found, with respect to the above-mentioned range, that to achieve a greater PL efficiency, the molar ratio y and the diameter D of the nanoparticle more preferably satisfy all of the following conditions (1a) to (3a), in corresponding to a shell thickness in the range of $0.8 \leq L_2 \leq 2.8$:

[Math. 3]

$$1.24 \times 0.67 \times \left\{ \left(1 + \frac{2 \times 0.8}{D - 2 \times 0.8}\right)^3 - 1 \right\} \leq \quad \text{(1a)}$$

$$y \leq 1.24 \times 0.9 \times \left\{ \left(1 + \frac{2 \times 2.8}{D - 2 \times 2.8}\right)^3 - 1 \right\}$$

$$y \leq 1.24(D^3 - 1) \quad \text{(2a)}$$

$$2.5 \leq D \leq 10 \quad \text{(3a)}$$

It was further found, with respect to the above-mentioned range, that to achieve a particularly high PL efficiency, the molar ratio y and the diameter D of the nanoparticle most preferably satisfy all of the following conditions (1b) to (3b), in corresponding to a shell thickness in the range of $1.0 \leq L_3 \leq 2.5$:

[Math. 4]

$$1.24 \times 0.67 \times \left\{ \left(1 + \frac{2 \times 1.0}{D - 2 \times 1.0}\right)^3 - 1 \right\} \leq \quad \text{(1b)}$$

$$y \leq 1.24 \times 0.9 \times \left\{ \left(1 + \frac{2 \times 2.5}{D - 2 \times 2.5}\right)^3 - 1 \right\}$$

$$y \leq 1.24(D^3 - 1) \quad \text{(2b)}$$

$$2.5 \leq D \leq 10 \quad \text{(3b)}$$

A particularly high PL efficiency is provided by nanoparticles whose composition satisfies the above conditions (1b) to (3b).

Synthesis under certain conditions may produce nanoparticles whose interface between the core and the shell is not clearly defined. The above-mentioned conditions determined by the element ratio are applicable even to such nanoparticles. Since X-ray diffraction reveals that the lattice constant of nanoparticles is identical to that of the corresponding bulk material, it is reasonable to assume as in the present invention that the specific gravity of the nanoparticles is the same as that of the bulk material.

In this specification, the "PL efficiency of semiconductor nanoparticles in a solution" refers to the ratio $(\Phi)PL/\Phi A$ of the number of photons $(\Phi PL)$ emitted as PL to the number of absorbed photons $(\Phi A)$. This PL efficiency is commonly used in this technical field, and is synonymous with an "internal quantum yield".

When the analysis sample is in the form of a solution, the PL efficiency can be calculated by using dye molecules having known PL efficiency, and comparing a solution of the dye molecules with the analysis sample in emission intensity and absorbance at an excitation wavelength. The comparison is usually made between the dye molecule solution (for example, an aqueous solution of quinine in 0.05 mol/l sulfuric acid) and the analysis sample while the absorbance of the analysis sample is conformed with that of the dye solution at the excitation wavelength (see, for example, a known method described in Dawson, Journal of Physical Chemistry, volume 72, page 3251 (1968)). When the analysis sample is in the form of a powder, flat plate, or thin film, measurement is usually made using an integrating sphere. A measurement apparatus is commercially available (for example, C9920 of Hamamatsu Photonics, K.K.)

Fluorescent Material Having Water-Dispersible Nanoparticles Dispersed Therein

The water-dispersible nanoparticles with a high PL efficiency obtained by the above method may have a surfactant on the surface, and may be dispersed in a matrix such as a polymeric material or a glass material.

In particular, the nanoparticles dispersed in a glass matrix have a high PL efficiency, and can form a fluorescent material with high stability.

Examples of glass materials that can be used as the matrix include glass materials containing silicon oxide as a main constituent. It is particularly preferable that an organoalkoxysilane is used as a precursor of a glass material, and the water-dispersible nanoparticles of the present invention are dispersed in the glass material by a sol-gel reaction to produce a fluorescent material.

Examples of organoalkoxysilanes include compounds represented by the formula (I):

$$SiX_n(OR)_{4-n} \quad \text{(I)}$$

(wherein n is 1, 2 or 3, and R is an alkyl group, and X is an aminoalkyl group, an mercaptoalkyl group, a haloalkyl group, or a phenyl group).

In Formula (1), n is preferably 1 or 2, and particularly preferably 1.

Examples of alkyl groups represented by R include alkyl groups containing 1 to 4 carbon atoms, such as methyl, ethyl, n-propyl, isopropyl, and n-butyl. Methyl, ethyl, and like groups are particularly preferable.

Examples of aminoalkyl groups include groups represented by $NH_2C_mH_{2m}$— (wherein m is an integer of 1 to 6). Linear aminoalkyl groups represented by $H_2N(CH_2)_m$— are particularly preferable. m is preferably 2 to 4, and particularly preferably 3.

Examples of mercaptoalkyl groups include groups represented by $HSC_qH_{2q}$— (wherein q is an integer of 1 to 10).

Linear mercapto groups represented by $HS(CH_2)_q$—(wherein q is an integer of 2 to 4) are particularly preferable. q is preferably 2 to 4, and particularly preferably 3.

Examples of haloalkyl groups include groups represented by $YC_rH_{2r}$—(wherein r is an integer of 1 to 10, and Y is a halogen atom). Linear haloalkyl groups represented by $Y(CH_2)_r$—(wherein q is an integer of 2 to 4, and Y is a fluorine atom, a chlorine atom, or a bromine atom) are particularly preferable. q is preferably 2 to 4, and particularly 3. Y is preferably a chlorine atom.

Examples of organoalkoxysilanes that can be preferably used include 3-aminopropyltrimethoxysilane (APS), mercaptopropyltrimethoxysilane (MPS), chloropropyltrimethoxysilane, and the like.

When such an organoalkoxysilane is used, a glass network structure $(—O—Si—)_p$: p>1) is formed by a usual sol-gel reaction comprising hydrolysis of the alkoxy group and condensation polymerization, and also presumably a functional group represented by X of Formula (I) is bonded to the surfactant attached to the surface of the semiconductor nanoparticle, thereby stabilizing the structure.

The organoalkoxysilane is used in a form usually used in the sol-gel process, i.e., in the form of a sol solution containing organoalkoxysilane. One example thereof is a sol solution prepared by mixing an organoalkoxysilane; an alcohol compound such as ethanol, methanol, propanol, or butanol; and water (for example, at an organoalkoxysilane:alcohol compound:water molar ratio of about 1:(1 to 60):(1 to 20), and then adding a small amount of catalyst, such as hydrochloric acid, acetic acid, nitric acid, or ammonia. However, when using an organoalkoxysilane containing an amino group such as APS, the reaction proceeds without the addition of a catalyst. A glass matrix can be formed by adding a semiconductor nanoparticle-dispersed aqueous solution to the sol solution and allowing hydrolysis and polycondensation reactions to proceed at a temperature in the range of room temperature to about 100° C. In the above process, about 0.5 to about 5 ml of the nanoparticle-dispersed aqueous solution (having a concentration of about $0.5 \times 10^{-6}$ mol/l to about $10 \times 10^{-6}$ mol/l) is added to 8 ml of the organoalkoxysilane. Further, the addition of about 0.1 to about 0.6 ml of a surfactant- and Group II ion-dispersed aqueous solution is effective for maintaining the PL efficiency. The molar ratio of surfactant/Group II ion in this aqueous solution may be about 1 to about 4. The concentration of the Group II ion may be about 0.04 to about 0.4 mol/l. The concentration of the nanoparticles in the luminescent glass matrix thus obtained is usually about $0.1 \times 10^{-5}$ mol/l to about $1 \times 10^{-5}$ mol/l.

The III-V nanoparticle-dispersed glass thus obtained can be used as a fluorescent material. The PL efficiency of the fluorescent material can be measured using an integrating sphere. This fluorescent material can be used in lighting devices, displays, indicating elements, biological fluorescent probes, fluorescent reagents, and like light-emitting devices.

The water-dispersible nanoparticles and the fluorescent material having the nanoparticles dispersed therein according to the present invention can be produced by the above methods.

The fluorescent material having the nanoparticles dispersed therein can be formed into any shape according to the intended use. For example, the nanoparticle-dispersed sol reaction mixture may be applied to a substrate by the spin-coating method, dip-coating method, etc., to allow a sol-gel reaction to proceed, thus forming a thin film of the fluorescent material with a film thickness of about 100 μm or less.

The thus-obtained fluorescent material of the invention basically has the properties of a glass, and has various excellent properties, such as excellent mechanical characteristics, heat resistance, and chemical stability. The semiconductor ultrafine particles embedded in the fluorescent material are shielded from the external atmosphere, and thus have excellent light resistance and are highly stable over time.

The fluorescent material obtained by the above method has high brightness and can emit light of various colors, when irradiated with light of a single wavelength. As stated above, this fluorescent material can be effectively utilized as a fluorescent material for various light-emitting devices (e.g., lighting devices, indicating elements) in place of known fluorescent materials. More specifically, the following are examples of applications for which the fluorescent material can be used.

In particular, white illumination light can be obtained by a combination of a 365 nm mercury lamp or UV LED with semiconductor nanoparticles that have particle sizes appropriately selected according to the excitation wavelength. Other examples of applications include light devices such as cold cathode fluorescent lamps and like liquid crystal backlighting, and liquid crystal projector light sources for presentations using a mercury lamp.

Indicating elements (e.g., displays) can be produced by applying a fluorescent material to a flat plate to form a fine pattern. A desired display can be obtained by alternately applying nanoparticles that emit three RGB colors to form many dots having diameters of about 0.1 mm, and irradiating the nanoparticles with UV light of different intensities varied according to the information signal.

When irradiated with strong excitation light, the temperature of the fluorescent material increased, thus resulting in accelerated deterioration. Therefore, for long-term stable use, the fluorescent material is preferably used at a lower temperature. The temperature at which the fluorescence material is used is preferably about 50° C. or less, and more preferably 40° C. or less. To achieve this temperature, the excitation light source is appropriately positioned, and preferably provided with a cooling system and a heat dissipation material. Examples of cooling systems include powerful cooling fans, cooling water, and Peltier elements. Examples of heat dissipation materials include metals, ceramics, and the like.

Advantageous Effects of Invention

The water-dispersible semiconductor nanoparticles of the invention have high PL efficiency and are highly stable in an aqueous solution. Moreover, the core of the nanoparticles contains no toxic Group II substances. The nanoparticles can be produced from inexpensive materials at a comparatively low temperature.

The fluorescent material having the semiconductor nanoparticles of the invention embedded in a glass matrix has a high PL efficiency and can be used as an element of optical devices, such as high-brightness displays and lighting devices. Furthermore, the fluorescent material of the present invention is highly stable over time.

BRIEF DESCRIPTION OF DRAWINGS

FIG. 1 is a schematic diagram illustrating a method of synthesizing InP nanoparticles by a solvothermal method.

FIG. 2 shows absorption spectra of the nanoparticles obtained by the size-selective precipitation method in step (1) of Example 1.

FIG. 3 shows PL and absorption spectra of the InP nanoparticles in the organic solution and in aqueous solution measured in Example 1.

FIG. 4 shows absorbance and PL spectra of the nanoparticles after irradiation with UV light, measured in Example 1.

FIG. 5 is a schematic diagram illustrating the method of producing InP nanoparticles and the condition of the nanoparticles in each step.

FIG. 6 shows absorption and PL spectra of the nanoparticles of different particle sizes after irradiation with UV light, measured in Example 2.

FIG. 7 shows absorption and PL spectra of the nanoparticles of different particle sizes before and after irradiation with UV light measured in Example 3.

FIG. 8 shows PL spectra of the nanoparticles after size selection, measured in Example 3.

FIG. 9 shows absorption and PL spectra of InP nanoparticles before and after being embedded in glass, measured in Example 5.

FIG. 10 shows absorption spectra of the size-selected nanoparticles measured in Example 6.

FIG. 11 shows absorption and PL spectra of the nanoparticles before and after irradiation with UV light, measured in Example 6.

FIG. 12 shows absorption spectra of the InP nanoparticles obtained after being heated for different lengths of time in Example 8.

FIG. 13 shows PL spectra of the nanoparticles after irradiation with UV light, measured in Example 8.

FIG. 14 shows absorption spectra of the nanoparticles obtained after being heated for different lengths of time in step (1) of Example 9.

FIG. 15 shows absorption and PL spectra of the nanoparticles after irradiation with UV light, measured in Example 9.

FIG. 16 shows absorption and PL spectra of the InP nanoparticles before and after irradiation with UV light, measured in Example 10.

FIG. 17 is a graph showing the relationship of UV-irradiation time to shell thickness (dashed line) and to PL efficiency (solid line) obtained when forming a ZnS shell on the surface of InP nanoparticles in Example 10.

DESCRIPTION OF EMBODIMENTS

The present invention will be described below in more detail, with reference to Examples. However, it should be understood that the scope of the present invention is not limited to these Examples. The PL efficiency of solutions was measured by using an aqueous solution of quinine in 0.05 mol/l sulfuric acid (PL efficiency: 55%) as a reference solution with excitation at 400 nm. The PL efficiency of the nanoparticle powder obtained by the size-selective precipitation method was measured using a quantum yield measuring apparatus ("C9920") of Hamamatsu Photonics, K.K.

EXAMPLE 1

(1) Process of Producing InP Nanoparticles

InP nanoparticles as a III-V semiconductor were prepared by the following method using a solvothermal method.

First, in a glove box having an argon atmosphere, 0.4 g of indium chloride ($InCl_3$), 3 ml of trioctylphosphine ($[CH_3(CH_2)_7]_3P$, TOP) as a surfactant, and 2.5 g of dodecylamine ($CH_3(CH_2)_{11}NH_2$, DDA) were added to an autoclave. Further, 5 ml of toluene ($C_6H_5CH_3$) was added as a solvent, and 0.5 ml of tris(dimethylamino)phosphine ($P[N(CH_3)_2]_3$) was added.

The autoclave was transferred to an electric furnace, and maintained at 75° C. for 1 hour. The temperature was raised to 180° C., and nanoparticles were grown for 24 hours. FIG. 1 is a schematic diagram illustrating the synthesis of InP nanoparticles by the solvothermal method.

10 ml of toluene and 6 ml of methanol were added to the nanoparticle dispersion obtained by the above method. After ample stirring, the mixture was centrifuged for 10 minutes, and the transparent supernatant thus obtained was collected to separate InP nanoparticles from reaction by-products.

The nanoparticle dispersed solution from which the reaction by-product had been removed was subjected to the size-selective precipitation method to obtain nanoparticles of different particle sizes. Methanol was used as a poor solvent. When the solution became slightly turbid, the solution was centrifuged and the obtained precipitates were collected and redispersed in hexane. The poor solvent was further added to the supernatant to resuspend the solution, and the solution was centrifuged. These procedures were repeated until the nanoparticles were completely removed from the solution, thus separating the InP nanoparticles into those having a narrow size distribution.

FIG. 2 shows absorption spectra of the nanoparticles obtained by the size-selective precipitation method. The results of the primary absorption peak position and width also confirmed that the nanoparticles after size selection have a uniform particle size. The X-ray diffraction results also confirmed that the particles thus produced and separated were InP nanoparticles. The PL efficiency of the obtained nanoparticles was as low as about 1%.

(2) Production of Water-Dispersible InP Nanoparticles

Nanoparticles of different particle sizes obtained by the size-selective precipitation method in step (1) were dispersed in a mixture of butanol and hexane (butanol:hexane volume ratio=1:2). The concentration of nanoparticles in the solution was calculated from the absorption spectra by using the absorption coefficient described in a publication (Adam et al., The Journal of Chemical Physics, volume 123, page 084706, (2005)), and was found to be about $0.3 \times 10^{-5}$ mol particles/liter. A glass bottle was equipped with a small stirring bar and placed on a hot plate stirrer; the heater's temperature was then set to 70° C. At this point, the temperature of the nanoparticle-dispersed solution contained in the glass bottle was about 50° C.

While the nanoparticle-dispersed solution was stirred, 2 ml of a mixed aqueous solution (ZT solution) containing zinc ions and thioglycolic acid as a surfactant was added. The ZT solution contained zinc ions at a concentration of 0.13 mol/l and at a zinc ion:thioglycolic acid molar ratio of 1:2.43. Further, sodium hydroxide was added to adjust the ZT solution to a pH of 11.0.

By stirring the solution, the nanoparticles in the organic layer were almost completely transferred to the aqueous layer, and the organic layer became completely transparent. In contrast, the aqueous layer became yellow, brown or like color according to the particle size of the nanoparticles. This aqueous solution was collected with a pipette, and transferred to a centrifuge tube. To remove the aggregated nanoparticles, centrifugation was performed and the supernatant was collected. FIG. 3 shows the absorption spectrum and emission spectrum of the nanoparticles before and after being dispersed in water. The nanoparticles dispersed in water emitted weak PL.

The supernatant solution was added to the centrifuge tube, and methanol was added as a poor solvent to suspend the solution. The suspension was centrifuged to obtain a water-dispersible nanoparticle powder.

When no surfactant was present in the aqueous solution (ZT solution) in the step of dispersing the InP nanoparticles in the aqueous solution, the nanoparticles were not satisfactorily dispersed, forming precipitates. When no zinc ion was present, the nanoparticles were dissolved and lost by stirring the solution, whereby both the organic and aqueous layers became transparent.

(3) Core/Shell-Structured Semiconductor Nanoparticle-Production Step

The water-dispersible nanoparticle powder obtained in step (2) was dissolved in the ZT solution described in step (2). With reference to the method described in a publication (Murase et al., Colloids and Surfaces A, volume 294, page 33 (2007)), the solution was irradiated with UV light to form a zinc sulfide shell on the InP nanoparticles.

First, a small stirring bar was placed into the nanoparticle dispersed solution. While being stirred, the solution was irradiated with a UV light with a wavelength of 365 nm at an intensity of 4.0 W/cm² for 20 to 120 minutes to measure the PL and absorption spectra every 10 minutes.

The nanoparticles thus obtained had an emission wavelength of 554 to 620 nm, and a PL efficiency of 34 to 47%. FIG. 4 is an example of the absorption and PL spectra of the nanoparticles after irradiation with light. The numerals shown in FIG. 4 are the Sample Nos. shown in Table 1 below. Table 1 shows the optical characteristics of the obtained nanoparticles.

Nanoparticles with a wide emission wavelength range of 450 nm to 750 nm can be obtained by adjusting the duration of the solvothermal method in step (1).

TABLE 1

Characteristics of nanoparticles irradiated with UV light

| Sample No. | Particle diameter (nm) | PL wavelength (nm) | PL efficiency (%) | PL spectral width (FWHM) (nm) |
|---|---|---|---|---|
| 1 | 3.69 | 621 | 39.5 | 80.6 |
| 2 | 3.56 | 616 | 44.8 | 78.4 |
| 3 | 3.32 | 607 | 44.5 | 78.6 |
| 4 | 3.19 | 602 | 40.0 | 83.4 |
| 5 | 2.99 | 590 | 47.5 | 83.4 |
| 6 | 2.76 | 566 | 33.7 | 83.4 |
| 7 | 2.42 | 554 | 33.9 | 84.4 |

Further, 1 ml of acetonitrile was added as a poor solvent to the irradiated nanoparticle-dispersed aqueous solution to suspend the solution, and the suspension was centrifuged to obtain nanoparticles.

The nanoparticle powder was then redispersed in 1 ml of water. The PL efficiency of the nanoparticles changed very little. This aqueous solution was maintained at room temperature in air for 6 months. The obtained solution maintained at least 70% of the original PL efficiency, and was found to be highly durable.

FIG. 5 is a schematic diagram illustrating the process of producing brightly emitting InP nanoparticles in Example 1.

EXAMPLE 2

InP nanoparticles were prepared as in step (1) of Example 1. Without performing the size-selective precipitation method, the InP nanoparticles were dispersed in an aqueous solution (ZT solution) in the same manner as in step (2).

Acetonitrile was added as a poor solvent to the nanoparticle-dispersed aqueous solution, and nanoparticle powders of different particle sizes were obtained by the size-selective precipitation method.

The different-sized powders were separately redispersed in the ZT solution according to the particle size. The dispersion was irradiated with UV light in the same manner as in step (3) of Example 1.

FIG. 6 shows the results of absorption spectra and PL intensity of the nanoparticles of different particle sizes after the above treatment. The numerals shown in FIG. 6 are the Sample Nos. shown in Table 2 below. The nanoparticles thus obtained were found to have an emission wavelength of 550 to 650 nm, and a PL efficiency of 30 to 55%.

Table 2 shows characteristics of the nanoparticles after irradiation with light.

TABLE 2

| Sample No. | PL wavelength (nm) | PL efficiency (%) | PL spectral width (FWHM) (nm) |
|---|---|---|---|
| 1 | 651 | 45.6 | 69.4 |
| 2 | 635 | 46.2 | 66.0 |
| 3 | 619 | 51.6 | 69.8 |
| 4 | 599 | 49.2 | 73.4 |
| 5 | 584 | 49.4 | 76.4 |
| 6 | 567 | 40.1 | 79.4 |
| 7 | 540 | 29.7 | 80.2 |

Nanoparticles emitting green to red light were obtained in both Examples 1 and 2. The results showed that the nanoparticles of Example 2 have a higher PL efficiency and a narrow PL spectrum. These results confirmed that a high PL efficiency is obtained by separating a nanoparticle power of different particle sizes according to the size-selective separation method immediately before irradiation with light.

EXAMPLE 3

InP nanoparticles were produced according to step (1) of Example 1. Without performing the size-selective precipitation method, the InP nanoparticles were dispersed in an aqueous solution in the same manner as in step (2).

A large amount of methanol was added as a poor solvent to the nanoparticle-dispersed aqueous solution to suspend the solution. The suspension was centrifuged to obtain substantially all the nanoparticles as precipitates.

The powder obtained was redispersed in 2 ml of the ZT solution, and irradiated with UV light under the same conditions as in step (3) of Example 1. FIG. 7 shows absorption and fluorescence spectra of the nanoparticles before and after irradiation with UV light. The results show that the irradiated nanoparticles have a PL efficiency of 65% and an emission wavelength of 645 nm.

Further, the poor solvent was added to the irradiated nanoparticle aqueous solution to suspend the solution, and a nanoparticle powder of different particle sizes was obtained by the size-selective precipitation method. FIG. 8 shows PL spectra of the size-selected nanoparticles. The results show that the size-selected nanoparticles have a PL efficiency of 56 to 70% and a PL wavelength of 604 to 645 nm.

Table 3 shows characteristics of the size-selected nanoparticles.

TABLE 3

Characteristics of the size-selected nanoparticles

| Sample No. | PL wavelength (nm) | PL efficiency (%) | PL spectral width (FWHM) (nm) |
|---|---|---|---|
| 1 | 648 | 56.3 | 81.2 |
| 2 | 644 | 70.2 | 83.6 |
| 3 | 636 | 68.3 | 88.4 |
| 4 | 625 | 65.4 | 91.8 |

TABLE 3-continued

Characteristics of the size-selected nanoparticles

| Sample No. | PL wavelength (nm) | PL efficiency (%) | PL spectral width (FWHM) (nm) |
|---|---|---|---|
| 5 | 616 | 65.5 | 92.4 |
| 6 | 604 | 59.0 | 93.4 |

Further, this aqueous solution was allowed to stand in air for 3 months. The solution maintained at least 80% of the original PL efficiency, and was found to be highly stable.

EXAMPLE 4

InGaP nanoparticles, i.e., a III-V semiconductor, were produced by a solvothermal method in the same manner as in Example 1.

First, in a glove box having an argon gas atmosphere, 0.28 g of indium chloride ($InCl_3$), 3 ml of trioctylphosphine as a surfactant, and 2.5 g of dodecylamine were added to an autoclave. 5 ml of toluene was added as a solvent. Further, 0.5 ml of tris(dimethylamino)phosphine was added, and 0.06 g of gallium chloride ($GaCl_3$) was weighed and added.

The autoclave was transferred to an electric furnace and maintained at 75° C. for 1 hour. The temperature was then raised to 180° C., and the nanoparticles were grown for 24 hours.

After methyl alcohol was added to this solution, the nanoparticles were size-selectively precipitated and collected. The nanoparticles were dispersed in a mixed solution of hexane and butanol. While stirring 2 ml of this solution, 2 ml of the ZT solution used in Example 1 was added. Further, the mixture was heated at 40° C. and stirred for 1 hour to thereby transfer the nanoparticles to the aqueous solution. The solution was then irradiated with UV light (wavelength of 365 nm, 4 $W/cm^2$) to form a zinc sulfide layer, thus producing water-dispersible nanoparticles capable of emitting light.

EXAMPLE 5

The irradiated nanoparticles obtained in Example 1 were incorporated into a glass matrix according to the method described in a publication (Murase et al., Langmuir, volume 20, page 1 (2004)).

First, 1 g of aminopropyltrimethoxysilane and 10 ml of methanol were placed into a fluororesin petri dish having a diameter of 5 cm. A small stirring bar was placed in the petri dish, and stirring was performed for 10 minutes. After adding 1 ml of water, stirring was carried out for 1 hour to allow hydrolysis to fully proceed, after which the stirring bar was removed. A dehydration condensation reaction was allowed to proceed. When this solution achieved a viscosity of 1000 cP (as measured with a vibratory viscometer VM-1G), a mixture of 1 ml of the InP/ZnS nanoparticle-dispersed solution obtained in Example 1 and 0.2 ml of the ZT solution used in step (2) of Example 1 was added. The mixture was further stirred for 10 minutes. The addition of the ZT solution resulted in the presence of an excess of a surfactant, thus effectively preventing aggregation. After 7 days, the solution was completely solidified to form a transparent glass.

FIG. 9 shows absorption and emission spectra of the nanoparticle-dispersed glass (green, red). The nanoparticles dispersed in the glass emitted light at wavelengths of 543 nm (green) and 637 nm (red), and the luminous efficiency was 18% (green) and 36% (red).

EXAMPLE 6

The chemical composition of InP nanoparticles having high PL efficiency was qualitatively and quantitatively analyzed by the EPMA method (Shimadzu EPMA-1610) in the following manner. After the nanoparticles were dispersed on a carbon tape, copper substrate, or silver paste, carbon was deposited thereon by vapor deposition to form conductive nanoparticles. As measurement conditions, an electron beam size of 10 μm, an accelerating voltage of 15.0 kV, and an irradiation current of 20 nA were used. The measurement was made for 10 seconds to 6 minutes. The reference sample used was an ICP analysis sample (a) having a composition similar to that of the analysis sample, as described below.

Three corrections (so-called "ZAF corrections"), i.e., atomic number effect correction (Z), absorption correction (A), and fluorescence excitation correction (F), were applied to the relative intensity of characteristic X-ray of the analysis sample to that of the reference sample to calculate a true concentration.

(1) Production of Size-Selected InP Nanoparticles (a) First, methanol was added to the InP nanoparticle solution obtained in step (1) of Example 1. After stirring, the mixture was centrifuged. The supernatant was transferred to a new microtube, and the precipitate was dissolved in a mixture of hexane and butanol (referred to as an HB solution; hexane:butanol volume ratio=2:1). This was used as sample S1.

(b) Methanol was added to the microtube containing the supernatant, and the mixture was stirred and centrifuged. The resulting precipitate was dissolved in an HB solution in the same manner as above. This was used as sample S2.

(c) Seven samples were prepared by repeating the above-mentioned steps of addition of methanol and centrifugation. FIG. 10 shows absorption spectra of the size-selected nanoparticles.

The particle size of the sample S4 obtained by the above method was about 3.1 nm. The sample S4 was dried in a microtube and used as an analysis sample (1).

(d) The steps (a) to (c) were performed in the same manner as above, except that two 15 ml centrifugation tubes were used in place of the microtube. A large amount of size-selected InP nanoparticles were produced thereby. InP nanoparticles (10 mg) having a particle size of 3.1 nm were separated therefrom and used as the ICP analysis sample (1).

(2) Production of Water-Dispersed InP Nanoparticles (a) 2 ml of the ZT solution described in step (3) of Example 1 was added to the rest of sample S4 (20 mg), and the mixture was heated to about 50° C. with stirring.

(b) After stirring for 30 minutes, all the nanoparticles in the organic layer had been transferred to the aqueous layer. The organic layer became completely transparent, whereas the aqueous layer became brown.

(c) The aqueous solution was collected and centrifuged to obtain the supernatant.

(d) Thereafter, methanol was added to suspend the supernatant. The suspension was centrifuged to obtain nanoparticles.

(e) The nanoparticles were partially dried and used as an analysis sample (2).

(3) Production of UV-Irradiated InP Nanoparticles 1

(a) The ZT solution was further added to the sample (2). The mixture was irradiated with UV light at a wavelength of 365 nm and an intensity of about 4 $W/cm^2$.

(b) After irradiation with UV light, acetonitrile was added to suspend the solution. The suspension was centrifuged to collect nanoparticles, and the nanoparticles were dried. The sample obtained by using the ZT solution in which the TGA/Zn molar ratio was 2.43 was used as an analysis sample (3).

FIG. 11 shows the absorbance and PL spectra of the analysis samples.

Table 4 shows the results of analyzing the analysis samples (1) to (3) by the EPMA method. Even when a reference rod was used as a reference substance in place of the ICP analysis sample (a), similar values were obtained.

TABLE 4

In/P molar fraction and molar ratio of the InP nanoparticles

|  | In | P | In/P |
|---|---|---|---|
| Analysis sample (1) | 16.6 | 9.9 | 1.7 |
| Analysis sample (2) | 6.8 | 5.2 | 1.3 |
| Analysis sample (3) | 0.64 | 0.34 | 1.9 |

The above results show that the In/P ratios (molar ratio) of these nanoparticles are larger than those of known materials (1.2 at most). The In/P ratio of the analysis sample (3) having a high PL efficiency in water was 1.9.

The molar fraction of zinc in the analysis sample (3) was found to be 28.1%, and the molar fraction of sulfur was found to be 30.4%. The molar ratio y of the Group II element to the Group III element was thus 43.9. The diameter D of the nanoparticles (as expressed in nanometers) was 6.2.

The above results show that the Group II/III molar ratio y and the diameter D of the nanoparticles (as expressed in nanometers) of the analysis sample (3) satisfy all the conditions (1b) to (3b) as described above.

When the duration of light irradiation was too short in the production process and the D value (as expressed in nanometers) was about 3.5, a PL efficiency of 10% or less resulted. On the other hand, when the particle size D (as expressed in nanometers) was too large and was more than 10, the PL efficiency was reduced. One of the factors that cause this reduction is probably the effect of lattice constant mismatch between the III-V semiconductor and the II-VI semiconductor.

EXAMPLE 7

Water-dispersible nanoparticles were prepared in the same manner as in Example 6, except that the shell was formed after the small nanoparticles had been removed. In this case, the molar fractions of In, P, Zn and S were 0.36%, 0.15%, 26.3% and 27.7%, respectively. The molar ratio of the Group II element to the Group III element was thus 73.0. The diameter D (as expressed in nanometers) was 5.5. The molar ratio y of the Group II element to the Group III element and the diameter D of the nanoparticles (as expressed in nanometers) satisfied all the conditions (1b) to (3b), which are the optimal conditions for achieving a high PL efficiency as described above. The nanoparticles emitted green light.

EXAMPLE 8

A production example of water-dispersible InP/ZnS nanoparticles capable of emitting long wavelength light is described below.

First, InP nanoparticles were prepared in the same manner as in step (1) of Example 1 except for heating at 180° C. for different lengths of time, i.e., 24 hours, 48 hours, 72 hours, or 96 hours, to produce nanoparticles having greater particle diameters. FIG. 12 shows absorption spectra of the nanoparticles obtained after being heated for different lengths of time.

The numerals shown in FIG. 12 are the Sample Nos. shown in Table 5 below. FIG. 12 shows that as the heating time increases, the absorption spectra shift to the longer wavelength region, thus indicating that the diameter of the nanoparticles increased.

Subsequently, the InP nanoparticles obtained in the above step were dispersed in a ZT solution in the same manner as in step (2) of Example 1, and a water-dispersible nanoparticle powder was obtained from the dispersion.

The nanoparticle powder obtained in the above step was then dispersed in a ZT solution and irradiated with UV light in the same manner as in step (3) of Example 1.

FIG. 13 shows PL spectra of the nanoparticles after irradiation with UV light. Table 5 below shows the characteristics of the nanoparticles after irradiation with UV light. The numerals shown in FIG. 13 are the Sample Nos. shown in Table 5 below.

The nanoparticles after irradiation with UV light had a PL efficiency of 11 to 52%, and a PL wavelength of 571 to 695 nm. The nanoparticles (Sample Nos. 4) at the longest wavelength region had a particle diameter of about 8.1 nm, as estimated from the irradiation time.

These results clearly show that the production method described in the present specification can produce nanoparticles with a greater particle diameter capable of emitting long wavelength light.

TABLE 5

Characteristics of the nanoparticles after irradiation with UV light

| Sample Nos. | Heating time (hr) | PL wavelength (nm) | PL efficiency (%) | PL spectral width (FWHM) (nm) |
|---|---|---|---|---|
| 1 | 24 | 571 | 51.6 | 92.6 |
| 2 | 48 | 634 | 41.5 | 96.4 |
| 3 | 72 | 661 | 39.3 | 71.4 |
| 4 | 96 | 695 | 11.1 | 71.6 |

EXAMPLE 9

(1) Step of Producing InP Nanoparticles by the Hot Soap Method

First, InP nanoparticles were synthesized by a hot soap method with reference to the method described in Talapin et al., Colloids and Surfaces A, volume 202, page 145 (2002).

More specifically, 0.7 g of indium chloride ($InCl_3$) and ml of trioctylphosphine [$CH_3(CH_2)_7]_3P$, TOP) were added to a three-neck flask in a glove box under an argon gas atmosphere (oxygen concentration: 5 ppm or less, dew point: −60° C. or lower) Further, 0.78 ml of tris(trimethylsilyl)phosphine (P[Si$(CH_3)_3]_3$, TMP) was added, and the mixture was stirred. 10 ml of dodecylamine ($CH_3(CH_2)_{11}NH_2$, DDA) was added to another three-neck flask and heated to 150° C. The mixture of indium chloride and TMP previously prepared was poured into this flask, whereby a vigorous reaction occurred. The resulting solution was heated to 240° C. to grow nanoparticles. By appropriately selecting the heating time, nanoparticle samples having different particle diameters were obtained. FIG. 14 shows absorption spectra of the nanoparticles obtained after being heated for different lengths of time. The numerals shown in FIG. 14 are the Sample Nos. shown in Table 6 below.

(2) Step of Producing Core/Shell Structured Semiconductor Nanoparticles

A ZnS shell was formed by the following method on the InP nanoparticles produced by the hot soap method, and an experiment was performed to obtain a desired PL.

InP nanoparticles produced by the hot soap method in the above Step (1) were dispersed in a ZT solution in the same manner as in Step (2) of Example 1, and a water-dispersible nanoparticle powder was obtained from the dispersion. Subsequently, the nanoparticles obtained in the above step were dispersed in a ZT solution and irradiated with UV light in the same manner as in Step (3) of Example 1.

FIG. 15 shows absorption and PL spectra of the nanoparticles before and after irradiation with UV light. The numerals shown in FIG. 15 are the Sample Nos. shown in Table 6.

The nanoparticles after irradiation with UV light had a PL efficiency of 10 to 42%, and a PL wavelength of 550 to 697 nm. Table 6 shows characteristics of the nanoparticles after irradiation with UV light.

TABLE 6

Characteristics of the nanoparticles after irradiation with UV light

| Sample Nos. | Heating temperature, heating time | PL wavelength (nm) | PL efficiency (%) | PL spectral width (FWHM) (nm) |
|---|---|---|---|---|
| 1 | 150° C., 10 min | 551 | 23.6 | 91 |
| 2 | 150° C., 2.5 hr | 566 | 30.5 | 107 |
| 3 | 240° C., 1 hr | 605 | 41.9 | 118 |
| 4 | 240° C., 12.5 hr | 622 | 18.9 | 128 |
| 5 | 240° C., 48.5 hr | 697 | 10.1 | 161 |

EXAMPLE 10

The following method was used to perform an elemental analysis of the nanoparticles obtained by the hot soap method.

First, the InP nanoparticles synthesized in step (1) of Example 9 were subjected to the method of Example 6 to produce size-selected nanoparticles (analysis sample (1)), water-dispersed nanoparticles (analysis sample (2)), and UV-irradiated nanoparticles (analysis sample (3)) as in Example 6.

The nanoparticles thus obtained were dissolved in nitric acid and diluted with ultrapure water. The chemical compositions of the nanoparticles were analyzed by the ICP-AES method ("IRIS Advantage", a product of Nippon Jarrell-Ash Co. Ltd.). Table 7 shows the results. FIG. 16 shows absorption and PL spectra of the analysis samples.

The results show that, just as with the InP nanoparticles obtained by the solvothermal method in Example 6, the InP nanoparticles produced by the hot soap method have an In/P molar ratio higher than that of known materials (1.2 at most).

The analysis sample (3) exhibiting a high PL efficiency (42%) in water had an In/P molar ratio of 1.27. Since the number of moles of zinc in the analysis sample (3) was 41.3 micromoles, the Zn/In molar ratio was 48.6. The analysis sample (3) had a particle diameter of 6.0 nm, and emitted red light. The above results satisfy all the optimal conditions (1b) to (3b) for obtaining a high PL efficiency.

TABLE 7

Numbers of moles of In and P and the In/P molar ratio in each InP nanoparticle solution

|  | In | P | In/P |
|---|---|---|---|
| Analysis sample (1) | 5.23 | 3.55 | 1.47 |
| Analysis sample (2) | 1.65 | 1.32 | 1.25 |
| Analysis sample (3) | 0.85 | 0.67 | 1.27 |

(unit: micromole)

EXAMPLE 11

The relationship of the duration of UV irradiation time for forming a ZnS shell to the resulting shell thickness and PL efficiency was examined by the following method.

InP nanoparticles were prepared according to the step (1) of Example 1. Without performing a size-selective precipitation method, the InP nanoparticles were dispersed in a ZT solution in the same manner as in step (2) of Example 1.

A poor solvent acetonitrile was added to the obtained nanoparticle dispersion, and nanoparticle powders with different particle diameters were obtained by the size-selective precipitation method.

One of these powders, i.e., nanoparticles having a core diameter of 2.5 nm, were dispersed again in the ZT solution, and irradiated with UV light in the same manner as in step (3) of Example 1. While maintaining the UV light intensity, changes in the shell thickness were inspected using a transmission electron microscope.

FIG. 17 is a graph showing the relationship of the duration of UV irradiation time to the PL efficiency of the resulting nanoparticles in the aqueous solution and to the thickness of the ZnS shell formed on the nanoparticles. Immediately after irradiation with UV light, the nanoparticles had a PL efficiency of 10% and a shell thickness of 0.6 nm. When UV irradiation was further continued, the shell thickness became 0.8 nm and a PL efficiency over 30% was obtained. Further, when the shell thickness became 1.0 nm, a PL efficiency of 50% was achieved.

These results correspond with the range calculated from wave function in which the electron does not leak out of the shell. Thus, the experimental results also match the calculation results. This experiment thus provided an indication of determining the shell thickness necessary to obtain a high PL efficiency.

The invention claimed is:

1. Nanoparticles having a core/shell structure consisting of a core comprising a Group III element and a Group V element at a molar ratio of the Group III element to the Group V element in the range of 1.25 to 3.0, and a shell comprising a Group II element and a Group VI element and having a thickness of 0.2 nm to 4 nm, the nanoparticles having a photoluminescence efficiency of 10% or more and a diameter of 2.5 to 10 nm.

2. The nanoparticles according to claim 1, wherein the molar ratio of the Group III element to the Group V element is in the range of 1.28 to 2.3.

3. The nanoparticles according to claim 1, comprising at least one Group III element selected from the group consisting of In, Ga and Al, and at least one Group V element selected from the group consisting of N, P, As and Sb.

4. The nanoparticles according to claim 1, comprising a Group II element and a Group VI element at a molar ratio of the Group VI element to the Group II element in the range of 0.75 to 1.3.

5. The nanoparticles according to claim 1, comprising at least one Group II element selected from the group consisting of Zn, Cd and Hg, and at least one Group VI element selected from the group consisting of S, Se, and Te.

6. The nanoparticles according to claim 1 comprising InP as the core and ZnS as the shell, wherein when the diameter of the nanoparticles is defined as D (as expressed in nanometers) and the molar ratio of the Group II element to the Group III element is defined as y, D and y satisfy all the following conditions (1) to (3):

[Math. 1]

$$1.24 \times 0.67 \times \left\{ \left(1 + \frac{2 \times 0.6}{D - 2 \times 0.6}\right)^3 - 1 \right\} \leq \qquad (1)$$
$$y \leq 1.24 \times 0.9 \times \left\{ \left(1 + \frac{2 \times 3.0}{D - 2 \times 3.0}\right)^3 - 1 \right\}$$

$$y \leq 1.24(D^3 - 1) \qquad (2)$$

$$2.5 \leq D \leq 10. \qquad (3)$$

7. The nanoparticles according to claim 1, which have a photoluminescence efficiency of 50% or more.

8. The nanoparticles according to claim 1, which can be dispersed in water.

9. The nanoparticles according to claim 8, wherein a thiol group of a thiol group- and carboxyl group-containing surfactant is bound to the nanoparticles.

10. A method of producing the water-dispersible nanoparticles of claim 1 comprising the steps of:

(1) bringing a dispersion containing III-V semiconductor nanoparticles in an organic solvent into contact with an aqueous solution containing a Group II element-containing compound and a Group VI element-containing compound to transfer the III-V semiconductor nanoparticles in the organic solvent dispersion to the aqueous solution; and (2) irradiating the aqueous solution with light having a wavelength of 300 to 600 nm after the III-V semiconductor nanoparticles have been transferred to the aqueous solution in step (1).

11. The method according to claim 10, wherein the III-V semiconductor nanoparticles are obtained by reacting a compound having a portion at which two types of Group V atoms are directly bonded, with a Group III element-containing compound by a solvothermal method.

12. The method according to claim 10, wherein the Group VI element-containing compound is a surfactant containing a Group VI element.

13. A fluorescent material comprising the nanoparticles of claim 1 dispersed in a matrix containing silicon oxide as a constituent.

14. The fluorescent material according to claim 13, wherein the matrix containing silicon oxide is a glass material formed by a sol-gel process using an organoalkoxysilane as a starting material.

15. A light-emitting device comprising the fluorescent material of claim 13 as a light source.

* * * * *